(12) United States Patent
Kishine

(10) Patent No.: US 10,567,647 B2
(45) Date of Patent: Feb. 18, 2020

(54) IMAGE PROCESSING APPARATUS AND IMAGE PROCESSING METHOD

(71) Applicant: FUJIFILM Corporation, Tokyo (JP)

(72) Inventor: Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/009,384

(22) Filed: Jun. 15, 2018

(65) Prior Publication Data
US 2018/0309926 A1    Oct. 25, 2018

Related U.S. Application Data

(63) Continuation of application No. PCT/JP2016/083698, filed on Nov. 14, 2016.

(30) Foreign Application Priority Data

Dec. 17, 2015    (JP) ................. 2015-246228

(51) Int. Cl.
H04N 5/232    (2006.01)
H04N 5/217    (2011.01)
(Continued)

(52) U.S. Cl.
CPC ....... *H04N 5/23235* (2013.01); *G06T 3/4053* (2013.01); *G06T 5/003* (2013.01);
(Continued)

(58) Field of Classification Search
CPC . G06T 2207/10024; G06T 2207/20024; G06T 2207/20192; G06T 3/4053;
(Continued)

(56) References Cited

U.S. PATENT DOCUMENTS

2002/0131095 A1*   9/2002   Koike ................. G06T 5/006
                                                               358/516
2006/0256226 A1*  11/2006   Alon .................. G02B 27/0012
                                                               348/335
(Continued)

FOREIGN PATENT DOCUMENTS

CN    101995644 A    3/2011
CN    102047167 A    5/2011
(Continued)

OTHER PUBLICATIONS

Chinese Office Action and Search Report, dated Nov. 14, 2018, for counterpart Chinese Application No. 201680073401.7, along with an English machine translation.
(Continued)

*Primary Examiner* — Amy R Hsu
(74) *Attorney, Agent, or Firm* — Birch, Stewart, Kolasch & Birch, LLP

(57) ABSTRACT

An image processing apparatus includes an image acquisition unit that acquires a captured image of an object captured through an imaging lens, a coordinate transformation unit that performs coordinate transformation for the captured image such that a sagittal resolution in a direction tangent to circumference having a center of an imaging surface as an origin and a tangential resolution in a radial direction perpendicular to the tangential direction are close to each other at a designated spatial frequency, and a resolution enhancement processing unit that performs a rotationally-symmetric resolution enhancement process for the coordinate-transformed image. According to this aspect, a rotationally-symmetric filter can be used for the resolution enhancement process. It is possible to prevent an increase in filter size or to perform a process at a high speed. It is
(Continued)

possible to prevent a process from being complicated due to the use of the filter for coordinate transformation.

16 Claims, 17 Drawing Sheets

(51) Int. Cl.
    *H04N 5/357*     (2011.01)
    *G06T 3/40*     (2006.01)
    *G06T 5/00*     (2006.01)
    *G06T 5/20*     (2006.01)

(52) U.S. Cl.
    CPC ............... *G06T 5/006* (2013.01); *G06T 5/20* (2013.01); *H04N 5/217* (2013.01); *H04N 5/35721* (2018.08); *G06T 2207/10024* (2013.01); *G06T 2207/20024* (2013.01); *G06T 2207/20192* (2013.01)

(58) Field of Classification Search
    CPC ........... G06T 5/003; G06T 5/006; G06T 5/20; H04N 5/217; H04N 5/23235; H04N 5/35721
    See application file for complete search history.

(56) References Cited

U.S. PATENT DOCUMENTS

| | | | |
|---|---|---|---|
| 2008/0239107 A1* | 10/2008 | Cho | H04N 5/217 348/241 |
| 2009/0201386 A1 | 8/2009 | Ono | |
| 2011/0025877 A1* | 2/2011 | Gallagher | G02B 26/005 348/222.1 |
| 2011/0032410 A1 | 2/2011 | Shigemitsu et al. | |
| 2011/0193997 A1 | 8/2011 | Hatakeyama | |
| 2015/0146046 A1 | 5/2015 | Ogasahara et al. | |
| 2015/0304527 A1* | 10/2015 | Chou | H04N 17/004 348/187 |
| 2018/0309926 A1 | 10/2018 | Kishine | |

FOREIGN PATENT DOCUMENTS

| | | |
|---|---|---|
| JP | 2004-328506 A | 11/2004 |
| JP | 2009-213130 A | 9/2009 |
| JP | 2010-87672 A | 4/2010 |
| JP | 2011-151627 A | 8/2011 |
| WO | WO 2017/104328 A1 | 6/2017 |

OTHER PUBLICATIONS

International Preliminary Report on Patentability (Form PCT/IPEA/409), dated Dec. 15, 2017, for International Application No. PCT/JP2016/083698, along with an English translation.

International Search Report and the Written Opinion of the International Searching Authority (Forms PCT/ISA/210 and PCT/ISA/237), dated Jan. 31, 2017, for International Application No. PCT/JP2016/083698, along with an English translation of the International Search Report.

Japanese Office Action for Japanese Application No. 2018-189315, dated Aug. 29, 2019, with English translation.

\* cited by examiner

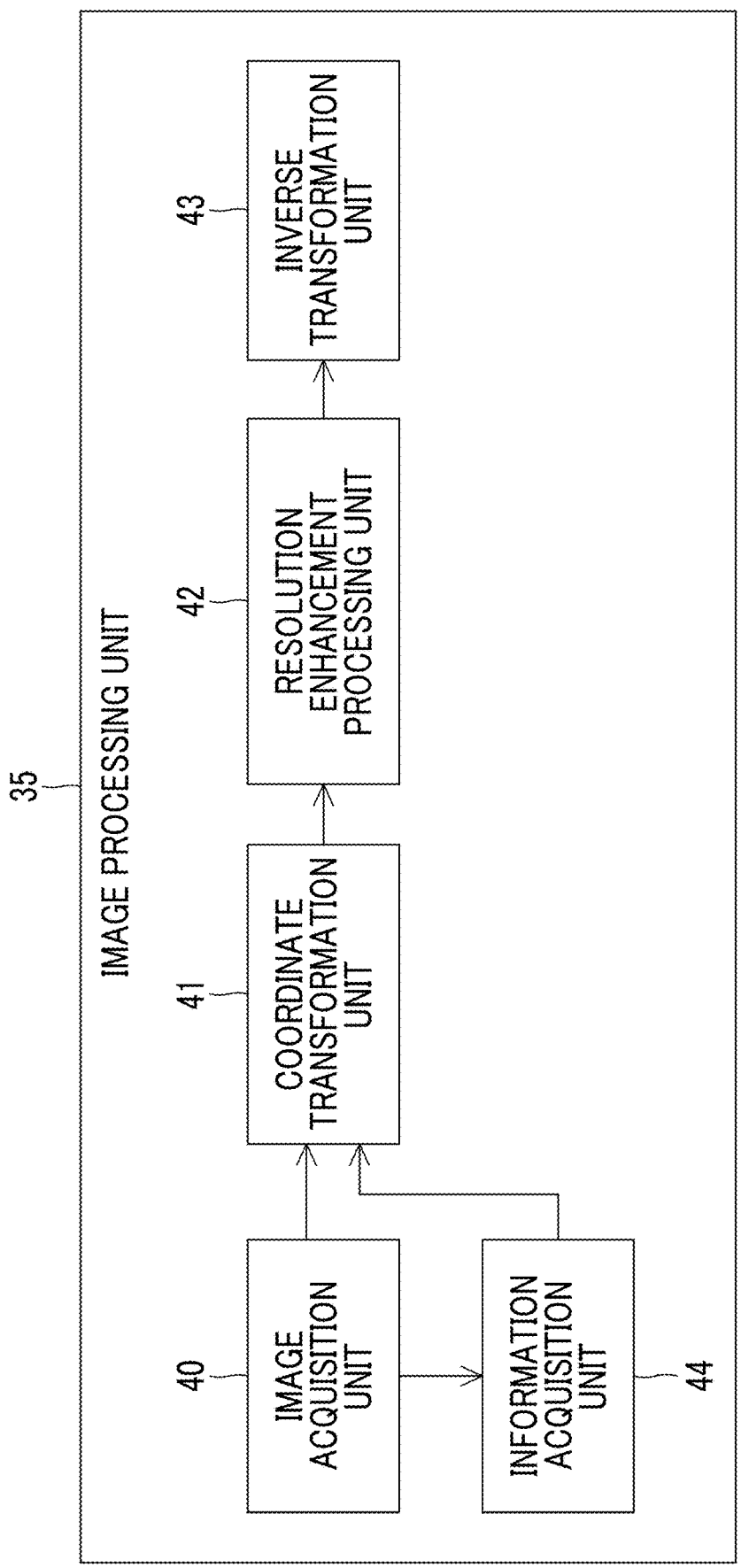

FIG. 8

| | RESOLUTION AFTER COORDINATE TRANSFORMATION (MTF)(*) | | | COORDINATE-TRANSFORMED IMAGE | |
|---|---|---|---|---|---|
| | SAGITTAL (S) | TANGENTIAL (T) | TANGENTIAL÷SAGITTAL | SIMULATION | EVALUATION |
| CONDITION 1 | 88.9% | 88.9% | 1.00 | Fujifilm | VERY GOOD (BLUR DIRECTION IS NOT PERCEIVABLE) |
| CONDITION 2 | 88.9% | 66.7% | 0.75 | Fujifilm | GOOD (BLUR DIRECTION IS NOT PERCEIVABLE) |
| CONDITION 3 | 88.9% | 44.3% | 0.50 | Fujifilm | ACCEPTABLE (BLUR OCCURS, BUT BLUR DIRECTION IS HARDLY PERCEIVABLE) |
| CONDITION 4 | 88.9% | 22.1% | 0.25 | Fujifilm | NOT ACCEPTABLE (BLUR IN TANGENTIAL DIRECTION IS PERCEIVABLE FROM IMAGE) |
| CONDITION 5 | 88.9% | 11.1% | 0.12 | Fujifilm ← Ta DIRECTION | NOT ACCEPTABLE (BLUR IN TANGENTIAL DIRECTION IS PERCEIVABLE FROM IMAGE) |

* VALUES IN REGION IN WHICH HORIZONTAL DIRECTION OF IMAGE IS ALIGNED WITH SAGITTAL DIRECTION OF LENS AND VERTICAL DIRECTION OF IMAGE IS ALIGNED WITH TANGENTIAL DIRECTION OF LENS

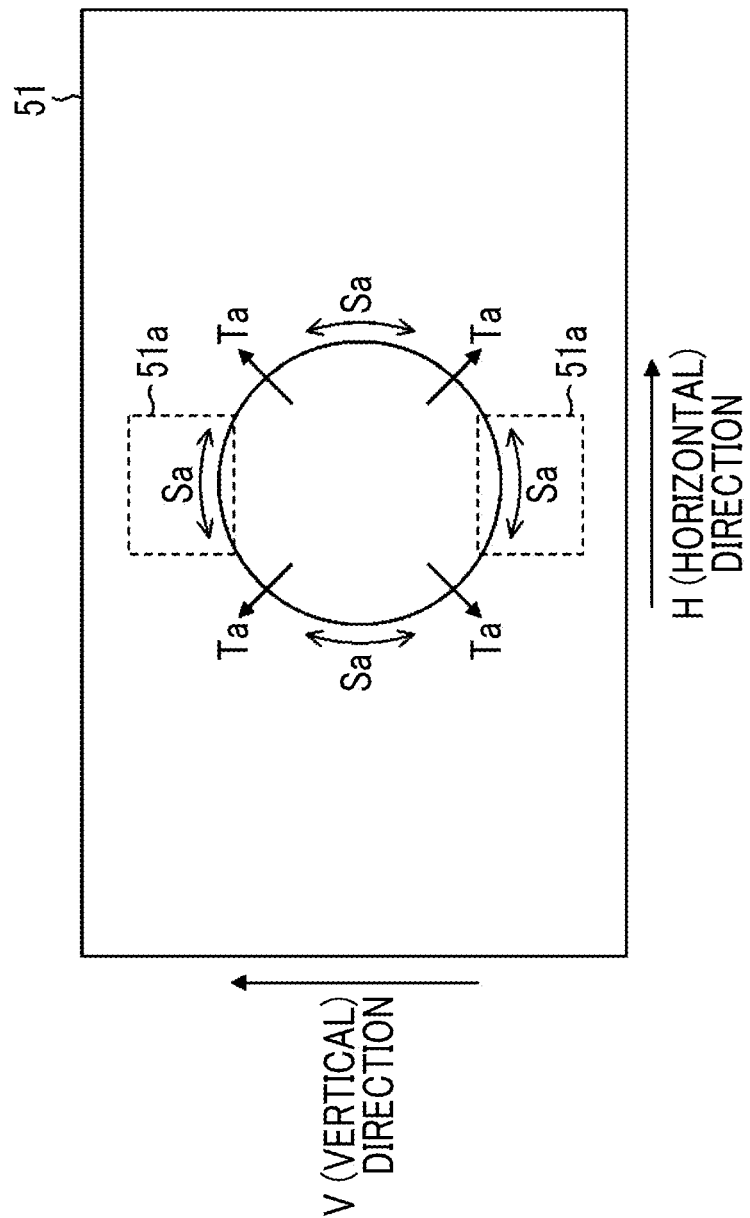

FIG. 12A

| 0 | −0.002 | −0.004 | −0.005 | −0.004 | −0.002 | 0 |
|---|---|---|---|---|---|---|
| −0.001 | −0.001 | −0.004 | −0.029 | −0.004 | −0.001 | −0.001 |
| −0.004 | −0.004 | −0.092 | −0.311 | −0.092 | −0.004 | −0.004 |
| −0.005 | −0.029 | −0.311 | 2.344 | −0.311 | −0.029 | −0.005 |
| −0.004 | −0.004 | −0.092 | −0.311 | −0.092 | −0.004 | −0.004 |
| −0.001 | −0.001 | −0.004 | −0.029 | −0.004 | −0.001 | −0.001 |
| 0 | −0.002 | −0.004 | −0.005 | −0.004 | −0.002 | 0 |

| 0 | −0.002 | −0.004 | −0.005 |
|---|---|---|---|
| −0.001 | −0.001 | −0.004 | −0.029 |
| −0.004 | −0.004 | −0.092 | −0.311 |
| −0.005 | −0.029 | −0.311 | 2.344 |

G

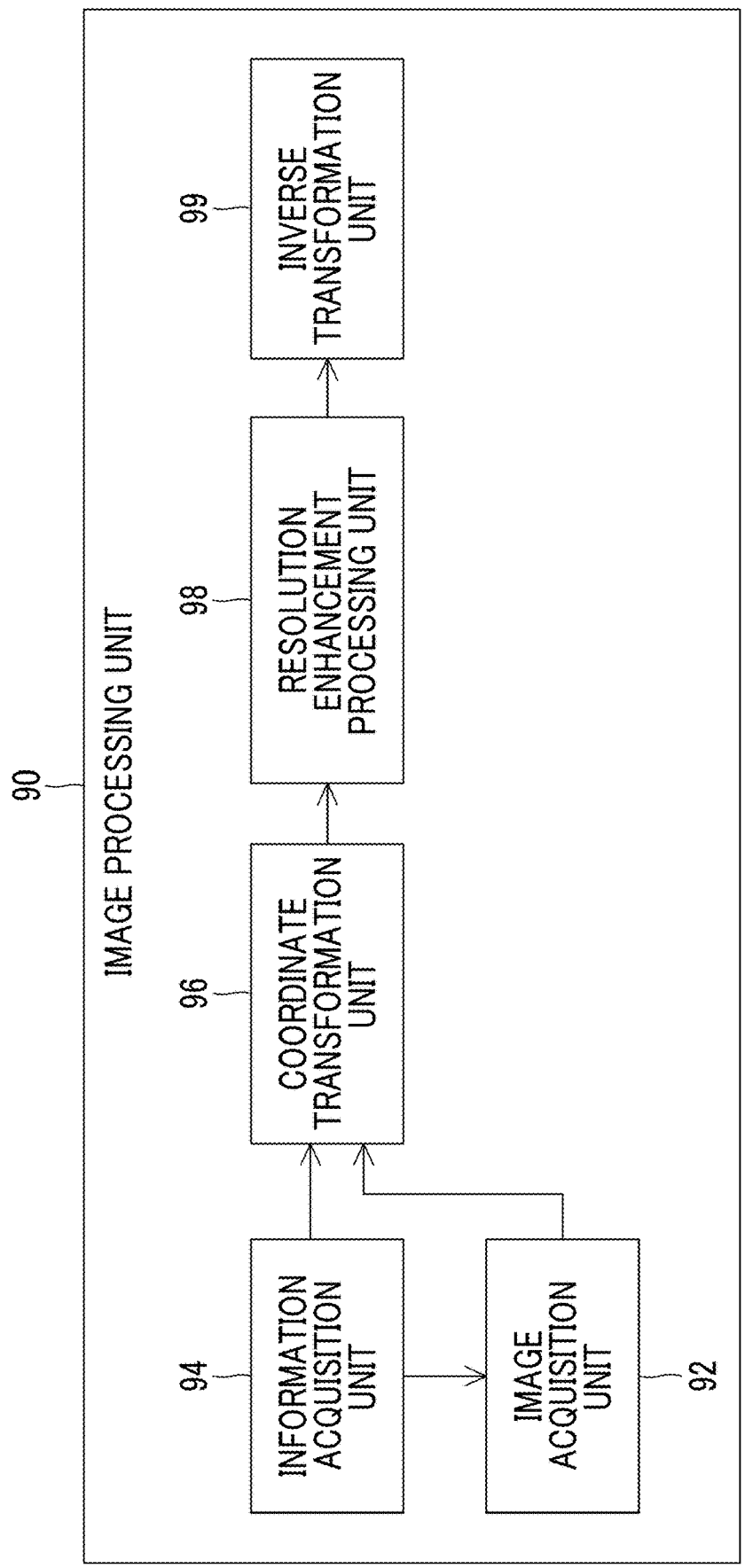

IMAGE PROCESSING APPARATUS AND IMAGE PROCESSING METHOD

CROSS-REFERENCE TO RELATED APPLICATIONS

The present application is a Continuation of PCT International Application No. PCT/JP2016/083698 filed on Nov. 14, 2016 claiming priority under 35 U.S.C § 119(a) to Japanese Patent Application No. 2015-246228 filed on Dec. 17, 2015. Each of the above applications is hereby expressly incorporated by reference, in their entirety, into the present application.

BACKGROUND OF THE INVENTION

1. Field of the Invention

The present invention relates to an image processing apparatus and an image processing method that process an image acquired by an optical system, and more particularly, to an image processing apparatus and an image processing method that perform image processing corresponding to the characteristics of the optical system.

2. Description of the Related Art

In some cases, the resolution of an image captured through an optical system is reduced due to the characteristics of the optical system and image processing (resolution enhancement process) for enhancing the resolution of the captured image is performed in order to prevent the reduction in resolution. The following processes have been known as the resolution enhancement process: a process (restoration process) which restores resolution using a point spread function (PSF) indicating the response of an optical system to a point light source; and a contour enhancement process that enhances the contour of an object.

In some cases, an imaging lens included in an optical system has different resolutions in a sagittal direction and a tangential direction or a meridional direction perpendicular to the sagittal direction. In this case, the resolution of a captured image varies depending on the direction due to a difference between the resolutions of the imaging lens. The imaging lens is designed such that the difference between the resolutions depending on the direction is reduced. However, in recent years, the difference between the resolutions depending on the direction has tended to increase with an increase in the number of pixels or a reduction in the F-number. Therefore, in some cases, the difference between the resolutions depending on the direction is corrected by image processing. For example, JP2011-151627A discloses a technique that corrects the mismatch between modulation transfer functions (MTFs) in a sagittal direction and a meridional direction and performs a restoration process to obtain a beautiful blur image (blur has a circular shape or a shape close to a circle) even in a case in which the restoration process is weak.

In addition, in some cases, an image captured through an optical system includes a distortion component caused by the distortion of the optical system. A technique has been known which corrects the distortion component in this case. For example, JP2010-087672A discloses a technique which corrects a distortion component after a point image restoration process (restoration process) to prevent a restoration filter used for the restoration process from being converted according to distortion correction conditions, thereby preventing an increase in the kernel size of the restoration filter.

SUMMARY OF THE INVENTION

However, in the technique according to the related art, it is difficult to effectively obtain a high-quality restored image in a case in which the resolution of the imaging lens varies depending on the direction or in a case in which distortion occurs. For example, in the technique disclosed in JP2011-151627A, a two-step filter process is performed, that is, the mismatch (MTF aberration) between MTFs in the sagittal direction and the meridional direction is corrected by the filter and the restoration process is performed using the filter. Therefore, the process is complicated and it is difficult to perform the process at a high speed. In the technique disclosed in JP2010-087672A, the distortion component is corrected after the point image restoration process. Therefore, it is necessary to perform the point image restoration in a state in which the image includes the distortion component (a state in which there is a difference between the resolutions depending on the direction). For this reason, it is necessary to use a rotationally-asymmetric filter for the point image restoration. As a result, the restoration process is complicated and it is difficult to perform the process at a high speed. The technique is not very effective.

The invention has been made in view of the above-mentioned problems and an object of the invention is to provide an image processing apparatus and an image processing method that effectively obtain a high-quality restored image.

In order to achieve the object, a first aspect of the invention provides an image processing apparatus comprising: an image acquisition unit that acquires a captured image of an object captured through an imaging lens; a coordinate transformation unit that performs coordinate transformation for the captured image such that a sagittal resolution in a direction tangent to circumference having a center of an imaging surface as an origin and a tangential resolution in a radial direction perpendicular to the tangential direction are close to each other at a designated spatial frequency; and a resolution enhancement processing unit that performs a rotationally-symmetric resolution enhancement process for the coordinate-transformed image. In the first aspect, after the coordinate transformation is performed such that the sagittal (tangential-direction) resolution and the tangential (radial-direction) resolution of the captured image are close to each other, the resolution enhancement process is performed. Therefore, it is possible to use a rotationally-symmetric filter for the resolution enhancement process and to prevent an increase in filter size or to perform a process at a high speed. In addition, since the process for making the resolutions close to each other is performed using coordinate transformation, it is possible to prevent a process from being complicated due to the use of a filter for coordinate transformation. The technique disclosed in JP2010-087672A has the problem that it is necessary to convert the filter used for the restoration process according to the distortion correction conditions. However, in the first aspect, it is not necessary to convert the filter.

In the first aspect, the resolutions at the designated spatial frequency are close to each other. Therefore, even in a case in which the difference between the resolutions in the tangential direction and the radial direction varies depending on the spatial frequency, it is possible to designate a desired spatial frequency and to make the resolutions at the designated spatial frequency close to each other. As a result, it is possible to effectively obtain a high-quality restored image. The spatial frequency designated in the first aspect may be a specific spatial frequency or may have a width (range).

As such, in the image processing apparatus according to the first aspect, it is possible to effectively obtain a high-quality restored image. In addition, in the first aspect, a point image restoration process (restoration process) or a contour enhancement process can be performed as the resolution enhancement process. In the first aspect and each of the following aspects, the term "rotationally-symmetric resolution enhancement process" means that the filter used for the resolution enhancement process is rotationally symmetric.

In a second aspect of the invention, the image processing apparatus according to the first aspect may further comprise an information acquisition unit that acquires information of the sagittal resolution and information of the tangential resolution of the captured image. The coordinate transformation unit may perform the coordinate transformation on the basis of the acquired information of the sagittal resolution and the acquired information of the tangential resolution. In the second aspect, the acquisition of information for making the resolutions close to each other is defined. In the second aspect, the acquisition of the resolution information by the information acquisition unit may be performed by, for example, a method which acquires information recorded on the imaging lens, a method which downloads the information from a Web, a method which analyzes the captured image to acquire the information, and a method which acquires the information on the basis of the user's input.

In a third aspect of the invention, the image processing apparatus according to the first or second aspect may further comprise an optical system including the imaging lens. The image acquisition unit may acquire the captured image through the optical system. In the third aspect, the image processing apparatus including the optical system for acquiring the captured image is defined.

In a fourth aspect of the invention, in the image processing apparatus according to the third aspect, in the imaging lens, a sagittal resolution in a direction tangent to circumference having an optical axis as a center may be higher than a tangential resolution in a radial direction perpendicular to the tangential direction. In the fourth aspect, a case in which the sagittal (tangential-direction) resolution of the imaging lens is higher than the tangential (radial-direction) resolution, which causes the resolution in the tangential direction to be higher than the resolution in the radial direction in the captured image of the object, is defined. In this case, it is also possible to obtain a high-quality restored image.

In a fifth aspect of the invention, in the image processing apparatus according to the fourth aspect, the coordinate transformation unit may perform at least one of coordinate transformation for compressing a peripheral portion of the captured image or coordinate transformation for expanding a central portion of the captured image. In the fifth aspect, coordinate transformation in a case in which the resolution in the tangential direction is higher than the resolution in the radial direction in the image as in the fourth aspect is specifically defined. In the fifth aspect, the expansion and the contraction by the coordinate transformation may be performed to the extent corresponding to an image height.

In a sixth aspect of the invention, in the image processing apparatus according to any one of the third to fifth aspects, distortion of the imaging lens may be positive. In the sixth aspect, since the distortion of the imaging lens is positive, the captured image has a pincushion distortion component (expansion increases toward the periphery of the image) caused by the positive distortion.

In a seventh aspect of the invention, in the image processing apparatus according to the third aspect, in the imaging lens, a tangential resolution in a radial direction of circumference having an optical axis as a center may be higher than a sagittal resolution in a tangential direction perpendicular to the radial direction. In the seventh aspect, a case in which the tangential (radial-direction) resolution of the imaging lens is higher than the sagittal (tangential-direction) resolution, which causes the resolution in the radial direction to be higher than the resolution in the tangential direction in the captured image of the object, is defined. In this case, it is also possible to obtain a high-quality restored image.

In an eighth aspect of the invention, in the image processing apparatus according to the seventh aspect, the coordinate transformation unit may perform at least one of coordinate transformation for expanding a peripheral portion of the captured image or coordinate transformation for compressing a central portion of the captured image. In the eighth aspect, coordinate transformation in a case in which the resolution in the radial direction is higher than the resolution in the tangential direction in the image as in the seventh aspect is specifically defined. In the eighth aspect, the expansion and the contraction by the coordinate transformation may be performed to the extent corresponding to an image height.

In a ninth aspect of the invention, in the image processing apparatus according to any one of the third, seventh, and eighth aspects, distortion of the imaging lens may be negative. In the ninth aspect, since the distortion of the imaging lens is negative, the captured image has a barrel distortion component (contraction increases toward the periphery of the image) caused by the negative distortion.

In a tenth aspect of the invention, in the image processing apparatus according to any one of the third to ninth aspects, the coordinate transformation unit may correct the distortion of the imaging lens using the coordinate transformation. According to the tenth aspect, the distortion component of the captured image can be corrected by the coordinate transformation for making the sagittal resolution and the tangential resolution close to each other.

In an eleventh aspect of the invention, the image processing apparatus according to any one of the first to tenth aspects may further comprise an inverse transformation unit that performs inverse transformation of the coordinate transformation for the image subjected to the resolution enhancement process. According to the eleventh aspect, it is possible to obtain a restored image having the same composition as the original image (the captured image before coordinate transformation). In addition, in the eleventh aspect, it may be determined whether to perform the inverse transformation on the basis of whether the distortion of the imaging lens is corrected by the coordinate transformation for making the resolutions close to each other.

In a twelfth aspect of the invention, in the image processing apparatus according to any one of the first to eleventh aspects, in a case in which the higher of the sagittal resolution and the tangential resolution at the designated spatial frequency is 1 in the coordinate-transformed image, the coordinate transformation unit may perform the coordinate transformation such that the lower of the sagittal resolution and the tangential resolution is equal to or greater than 0.5, preferably equal to or greater than 0.75. In the twelfth aspect, the relationship between the sagittal resolution and the tangential resolution for performing the rotationally-symmetric resolution enhancement process is defined.

In order to achieve the object, a thirteenth aspect of the invention provides an image processing method that is performed in an image processing apparatus comprising an image acquisition unit, a coordinate transformation unit, and a resolution enhancement processing unit. The image processing method comprises: an image acquisition step of allowing the image acquisition unit to acquire a captured image of an object captured through an imaging lens; a coordinate transformation step of allowing the coordinate transformation unit to perform coordinate transformation for the captured image such that a sagittal resolution in a direction tangent to circumference having a center of an imaging surface as an origin and a tangential resolution in a radial direction perpendicular to the tangential direction are close to each other at a designated spatial frequency; and a resolution enhancement processing step of allowing the resolution enhancement processing unit to perform a rotationally-symmetric resolution enhancement process for the coordinate-transformed image. According to the thirteenth aspect, it is possible to effectively obtain a high-quality restored image, similarly to the first aspect.

According to a fourteenth aspect of the invention, the image processing method according to the thirteenth aspect may further comprise an information acquisition step of acquiring information of the sagittal resolution and information of the tangential resolution of the captured image. In the coordinate transformation step, the coordinate transformation may be performed on the basis of the acquired information of the sagittal resolution and the acquired information of the tangential resolution. In the fourteenth aspect, similarly to the second aspect, since the information of the sagittal and tangential resolutions of the captured image is acquired, appropriate coordinate transformation is performed.

According to a fifteenth aspect of the invention, the image processing method according to the thirteenth or fourteenth aspect may further comprise an inverse transformation step of performing inverse transformation of the coordinate transformation for the image subjected to the resolution enhancement process. According to the fifteenth aspect, similarly to the eleventh aspect, it is possible to obtain a restored image having the same composition as the original image (the captured image before coordinate transformation). In the fifteenth aspect, similarly to the eleventh aspect, it may be determined whether to perform the inverse transformation on the basis of whether the distortion of the imaging lens can be corrected.

As described above, according to the image processing apparatus and the image processing method of the invention, it is possible to effectively obtain a high-quality restored image.

BRIEF DESCRIPTION OF THE DRAWINGS

FIG. 3 is a block diagram illustrating an example of the functional configuration of an image processing unit.

FIG. 8 is a table illustrating the results of an image simulation.

FIG. 9 is a diagram illustrating a region used for the image simulation illustrated in FIG. 8 in the captured image.

FIGS. 12A and 12B are diagrams illustrating an example of a restoration filter.

FIG. 19 is a block diagram illustrating the configuration of a computer.

DESCRIPTION OF THE PREFERRED EMBODIMENTS

Hereinafter, embodiments of an image processing apparatus and an image processing method according to the invention will be described with reference to the accompanying drawings.

First Embodiment

Figure 1:
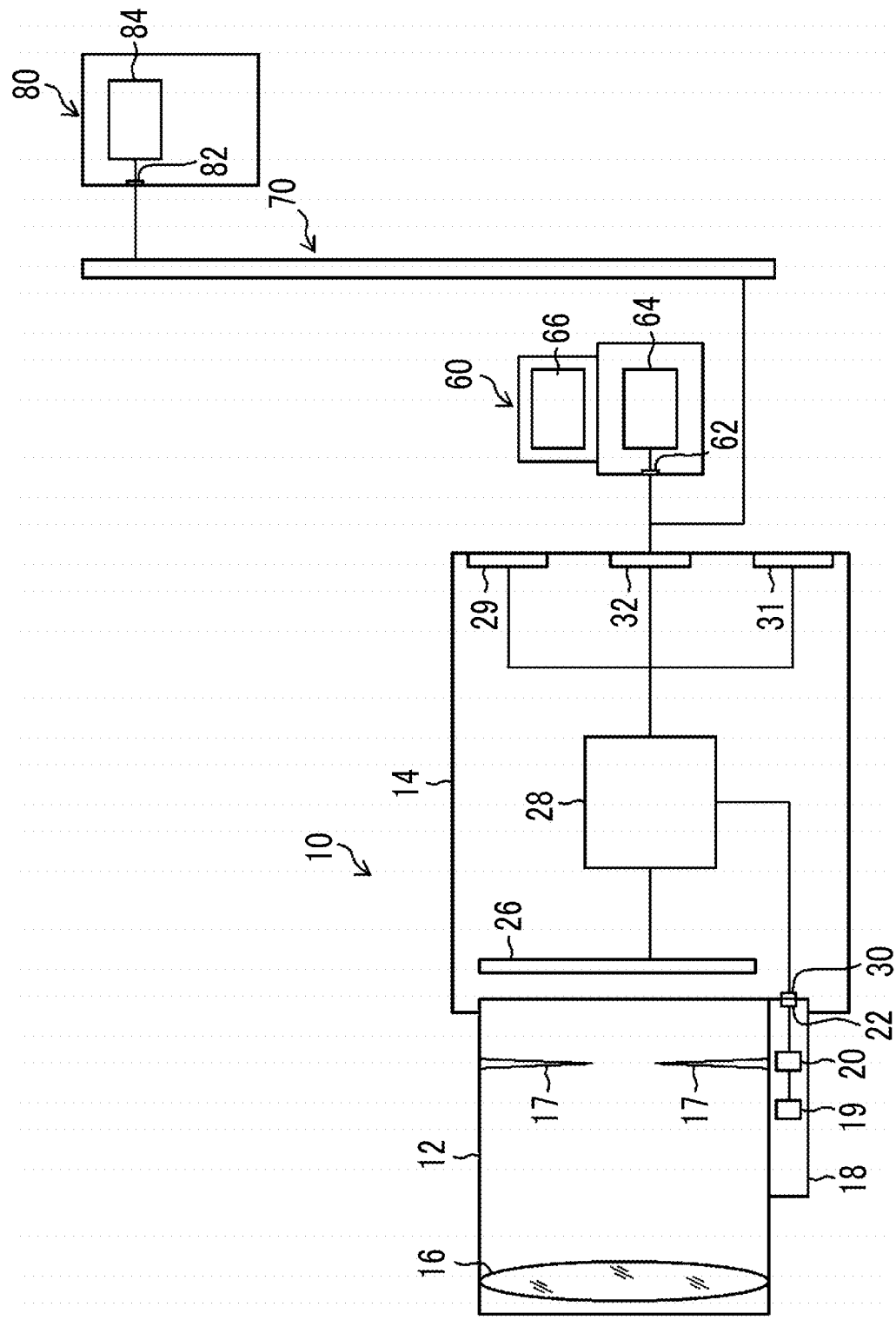
FIG. 1 is a block diagram illustrating a digital camera according to a first embodiment.

In a first embodiment, a case in which the invention is applied to a digital camera (image processing apparatus) that can be connected to a computer will be described. FIG. 1 is a block diagram illustrating a digital camera 10 connected to a computer.

<Configuration Digital Camera>

The digital camera 10 includes a lens unit 12 and a camera body 14 including an imaging element 26. The lens unit 12 and the camera body 14 are electrically connected to each other through a lens unit input/output unit 22 of the lens unit 12 and a camera body input/output unit 30 of the camera body 14. The digital camera 10 can be used in various fields. For example, the digital camera 10 can be used in a security field (surveillance camera) or a medical field (endoscope) in addition to a general imaging field.

The lens unit 12 includes an optical system including, for example, an imaging lens 16 and a stop 17 and an optical system operation unit 18 that controls the optical system. The optical system operation unit 18 includes a memory 19 on which resolution information and distortion information which will be described below are recorded, a lens unit controller 20 connected to the lens unit input/output unit 22, and an actuator (not illustrated) that operates the optical system. The lens unit controller 20 controls the optical system through the actuator on the basis of a control signal that is transmitted from the camera body 14 through the lens unit input/output unit 22 and performs, for example, focus control or zoom control by the movement of lenses and the control of the amount of opening of the stop 17.

The imaging element 26 of the camera body 14 includes a condensing microlens, R (red), G (green), and B (blue) color filters, and an image sensor (for example, a photodiode, a complementary metal oxide semiconductor (CMOS), or a charge-coupled device (CCD)). The imaging element 26 converts an optical image of an object formed by the optical system (for example, the imaging lens 16 and the stop 17) of the lens unit 12 into an electric signal and transmits the image signal (original image data) to the camera body controller 28.

In this example, the imaging element 26 captures the image of the object using the optical system and outputs the original image data and the original image data is transmitted to an image processing unit 35 of the camera body controller 28, which will be described in detail below.

Figure 2:
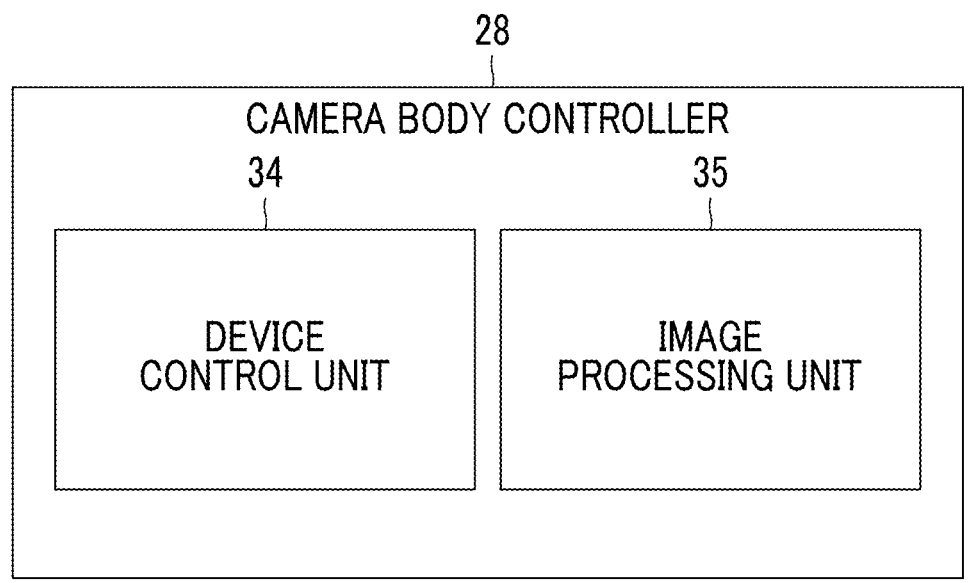
FIG. 2 is a block diagram illustrating an example of the functional configuration of a camera body controller.

As illustrated in FIG. 2, the camera body controller 28 includes a device control unit 34 and the image processing unit 35 and controls the overall operation of the camera body 14. For example, the device control unit 34 controls the output of an image signal (image data) from the imaging element 26, generates a control signal for controlling the lens unit 12, transmits the control signal to the lens unit 12 (lens unit controller 20) through the camera body input/output unit 30, and transmits image data (for example, RAW (Raw image format) data or Joint Photographic Experts Group (JPEG) data) before and after image processing to an external apparatus (for example, a computer 60) that is connected through an input/output interface 32. In addition, the device control unit 34 appropriately controls various devices, such as a liquid crystal monitor 31 (see FIG. 1) and an electronic view finder (EVF) (not illustrated), provided in the digital camera 10.

The image processing unit 35 can perform any image processing for the image signal from the imaging element 26 if necessary. For example, the image processing unit 35 appropriately performs various types of image processing such as a sensor correction process, a demosaicing (synchronization) process, a pixel interpolation process, a color correction process (for example, an offset correction process, white balance processing, color matrix processing, or a gradation correction process), RGB image processing (for example, a tone correction process or an exposure correction process), an RGB/YCrCb conversion process, and an image compression process. The image obtained by the image processing can be displayed on the liquid crystal monitor 31.

The digital camera 10 illustrated in FIG. 1 includes other devices (for example, a shutter) required for imaging. The user can appropriately determine and change various settings for imaging, for example, inputs or settings (for example, the acquisition of the resolution information and distortion information of the lens unit 12, the designation of a spatial frequency, and information indicating whether to perform inverse transformation) related to coordinate transformation or a resolution enhancement process which will be described below through a user interface 29 (for example, various buttons and switches) provided in the camera body 14. The user interface 29 is connected to the camera body controller 28 (the device control unit 34 and the image processing unit 35). Various settings determined and changed by the user are reflected in various processes of the camera body controller 28. The user can determine and change various settings through the user interface 29 while seeing the image or information displayed on the liquid crystal monitor 31.

The camera body controller 28 transmits the image data subjected to the image processing to, for example, a computer 60 through the input/output interface 32. The format of the image data transmitted from the digital camera 10 (camera body controller 28) to, for example, the computer 60 is not particularly limited and may be any format, such as a RAW format, a JPEG format, or a tag image file format (TIFF). Therefore, the camera body controller 28 may associate a plurality of related data items, such as header information (for example, imaging information including the imaging date and time, the type of device, the number of pixels, and the F-number), main image data, and thumbnail image data to generate one image file, as in a so-called exchangeable image file format (Exif), and may transmits the image file to the computer 60.

The computer 60 is connected to the digital camera 10 through the input/output interface 32 of the camera body 14 and a computer input/output unit 62 and receives data, such as image data, transmitted from the camera body 14. A computer controller 64 controls the overall operation of the computer 60, performs image processing for the image data from the digital camera 10, and controls communication with, for example, a server 80 that is connected to the computer input/output unit 62 through a network line such as an Internet 70. The computer 60 includes a display 66. For example, the content of the process of the computer controller 64 is displayed on the display 66 if necessary. The user can input data or commands to the computer controller 64 through input means (not illustrated), such as a keyboard, while seeing the information displayed on the display 66. In this way, the user can control the computer 60 or apparatuses (the digital camera 10 and the server 80) connected to the computer 60.

The server 80 includes a server input/output unit 82 and a server controller 84. The server input/output unit 82 forms a transmission and reception connection unit to an external apparatus, such as the computer 60, and is connected to the computer input/output unit 62 of the computer 60 through the network line such as the Internet 70. The server controller 84 transmits and receives data to and from the computer controller 64 if necessary, downloads data to the computer 60, performs arithmetic processing, and transmits the results of the arithmetic processing to the computer 60 in cooperation with the computer controller 64 in response to a control command signal from the computer 60.

Each controller (the lens unit controller 20, the camera body controller 28, the computer controller 64, and the server controller 84) includes circuits required for a control process. For example, each controller includes an arithmetic processing circuit (for example, a central processing unit (CPU)) and a memory. In addition, the communication among the digital camera 10, the computer 60, and the server 80 may be wired communication or wireless communication. The computer 60 and the server 80 may be integrated with each other. The computer 60 and/or the server 80 may be omitted. Alternatively, the digital camera 10 may have a communication function with the server 80 such that data is directly transmitted and received between the digital camera 10 and the server 80.

<Functions of Image Processing Unit>

FIG. 3 is a functional block diagram illustrating an example of the functional configuration of the image processing unit 35 (information acquisition unit) according to the first embodiment. The image processing unit 35 is provided in the camera body controller 28 and has an image acquisition unit 40, a coordinate transformation unit 41, a resolution enhancement processing unit 42, an inverse transformation unit 43, and an information acquisition unit 44 in addition to the function of the demosaicing process.

The image acquisition unit 40 acquired a captured image which has been acquired from the imaging element 26 by an operation of capturing the image of an object using the optical system. Here, the captured image is an image based on the image data which is output from the imaging element 26 by the operation of capturing the image of the object. The format of the image is not particularly limited as long as the coordinate transformation unit 41 can perform coordinate transformation for the image. For example, the image acquisition unit 40 acquires, as the captured image, the image data subjected to a sensor correction process, a demosaicing process, a pixel interpolation process, a color correction process, RGB image processing, and an RGB/YCrCb conversion process. Hereinafter, a case in which Y (brightness value) of a YCrCb-converted image is processed will be described.

The coordinate transformation unit 41 performs coordinate transformation for the captured image acquired by the image acquisition unit 40 such that a sagittal (tangential-direction) resolution and a tangential (radial-direction) resolution are close to each other. The resolution enhancement processing unit 42 performs a rotationally-symmetric resolution enhancement process for the coordinate-transformed image. The inverse transformation unit 43 performs inverse transformation of the coordinate transformation performed by the coordinate transformation unit 41 for the image subjected to the resolution enhancement process. The information acquisition unit 44 acquires the information of the sagittal and tangential resolutions of the imaging lens 16 and the information of the distortion of the imaging lens 16 stored in the memory 19 of the lens unit 12. The image processing performed by these functions of the image processing unit 35 will be described in detail below.

<Acquisition of Resolution and Distortion Information>

The information of the sagittal and tangential resolutions of the captured image is required to perform coordinate transformation which will be described below. The resolution of the captured image depends on the resolution of the imaging lens 16. Therefore, the information acquisition unit 44 (information acquisition unit) of the image processing unit 35 acquires the information of the sagittal resolution and the information of the tangential resolution of the imaging lens 16 from the memory 19 of the lens unit 12 and calculates the resolution of the captured image from the acquired information (Step S11 in FIG. 6: an information acquisition step). In addition, the resolution information of the imaging lens 16 may be acquired from the Internet 70 in addition to the memory 19 or the information acquisition unit 44 may analyze the captured image (for example, a captured image 51 illustrated in FIG. 4B) to acquire the resolution information. Alternatively, the following configuration may be used: the user inputs information through the user interface 29 while seeing the image or information displayed on the liquid crystal monitor 31 and the information acquisition unit 44 acquires the information. The distortion information of the imaging lens 16 can be acquired by the information acquisition unit 44 through, for example, the memory 19 or the Internet 70, image analysis, and a user input, similarly to the acquisition of the resolution information.

Example 1

<Object and Captured Image>

Figure 4A:
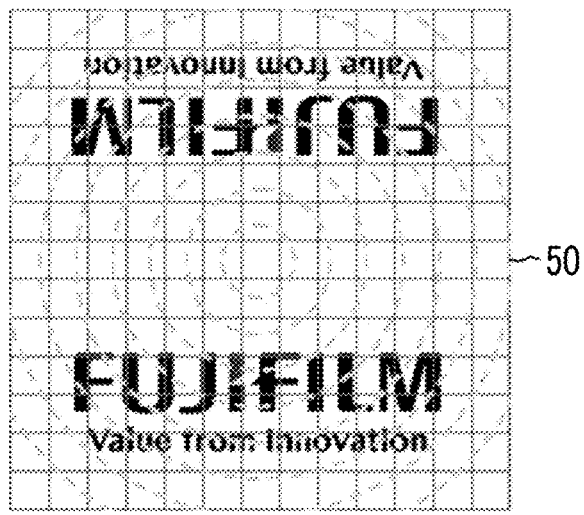
FIGS. 4A to 4C are diagrams schematically illustrating an object image, a captured image, and a coordinate-transformed image.
Figure 4B:
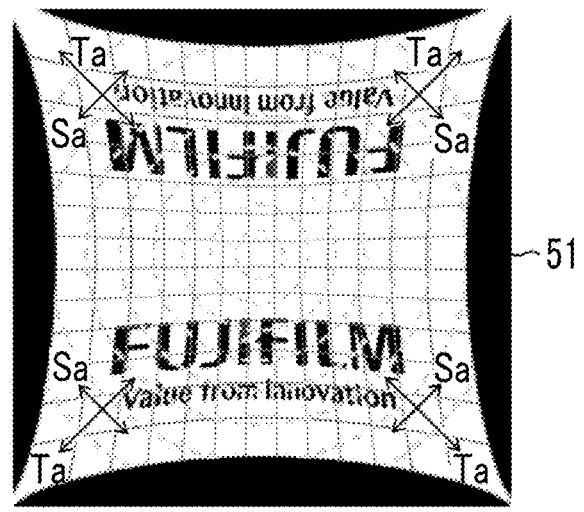

FIG. 4A is a diagram schematically illustrating an object 50. FIG. 4B is a diagram schematically illustrating the captured image 51 acquired by the image acquisition unit 40 in a case in which the digital camera 10 captures the image of the object 50. The image acquisition unit 40 transmits the acquired captured image 51 to the coordinate transformation unit 41. In the captured image 51 illustrated in FIG. 4B, the tangential direction of the imaging lens 16 (a radial direction of circumference having the optical axis as the center) is represented by Ta and the sagittal direction of the imaging lens 16 (a direction tangent to the circumference having the optical axis as the center; a direction perpendicular to the radial direction) is represented by Sa. In FIGS. 4A to 4C, FIGS. 13A to 13C, and FIG. 15, characters "FUJIFILM Value from Innovation" are a registered trademark.

<Sagittal and Tangential Resolutions>

In addition, the captured image 51 depends on the resolution of the imaging lens 16 and has different resolutions in the sagittal and tangential directions. Here, the resolution is an index indicating the degree of image blur. Various indexes, such as a modulation transfer function (MTF) and a spatial frequency response (SFR), can be used. In the drawings which will be described below, the MTF of the imaging lens 16 is used as the index indicating the resolution of the captured image 51.

Figure 5:
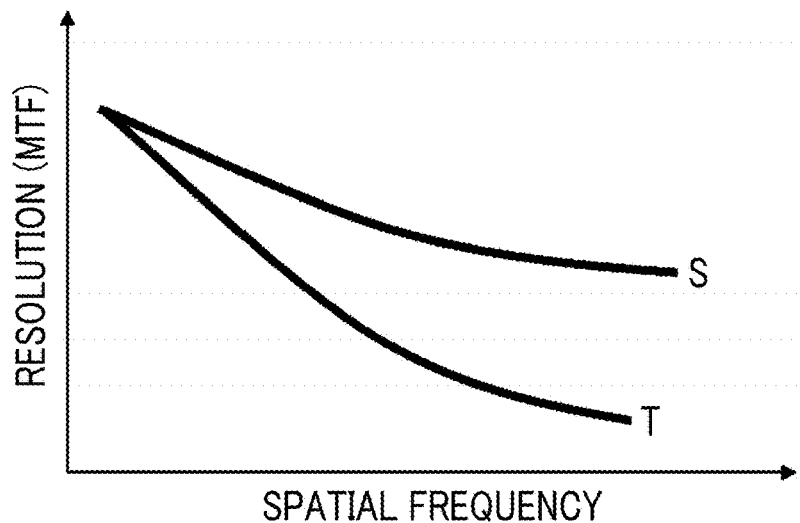
FIG. 5 is a diagram illustrating an example of the resolution of the captured image.

FIG. 5 is a diagram illustrating an example of a resolution S in the sagittal direction (a direction tangent to circumference having the center of an imaging surface as the origin) and a resolution T in the tangential direction (a radial direction perpendicular to the tangential direction) in the captured image 51. FIG. 5 shows an example of a case in which the sagittal resolution is higher than the tangential resolution regardless of a spatial frequency. In this example, all spatial frequencies are designated as the spatial frequency for making the resolutions close to each other to the coordinate transformation unit 41 (image processing unit 35).

<Distortion Component of Captured Image>

Since the image of the object 50 is captured through the imaging lens 16, distortion (distortion component) occurs in the captured image 51 due to the characteristics (distortion) of the imaging lens 16. FIG. 4B illustrates an example in which the distortion of the imaging lens 16 is positive and the captured image 51 has a "pincushion" (expansion increases toward the periphery of the image) distortion component due to the distortion.

<Outline of Image Processing>

Figure 6:
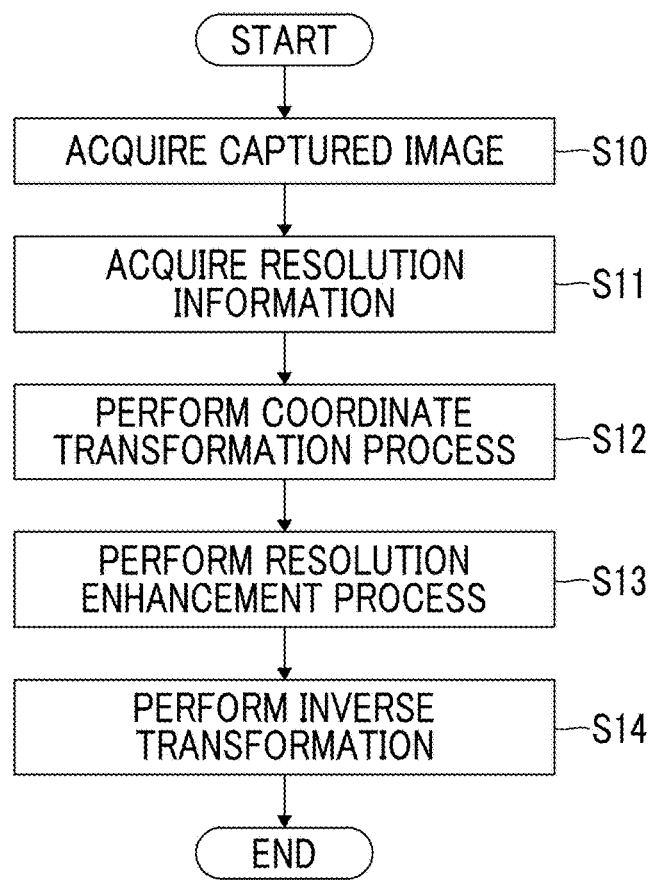
FIG. 6 is a flowchart illustrating the operation of an image processing unit.

FIG. 6 is a diagram illustrating the outline of image processing (image processing method) in the image processing unit 35. First, the image acquisition unit 40 of the image processing unit 35 acquires the captured image 51 obtained from the imaging element 26 by the operation of capturing the image of the object 50 using the optical system (Step S10: an image acquisition step). In addition, the information acquisition unit 44 acquires the information of the sagittal resolution S of the captured image 51 and the information of the tangential resolution T of the captured image 51 from the memory 19 of the lens unit 12 (Step S11: an information acquisition step). Then, the coordinate transformation unit 41 performs coordinate transformation for the captured image 51 on the basis of the information of the resolutions acquired in Step S11 and generates a coordinate-transformed image 52 illustrated in FIG. 4C (Step S12: a coordinate transformation step).

After the coordinate transformation, the resolution enhancement processing unit 42 performs a resolution enhancement process for the coordinate-transformed image 52 (Step S13: a resolution enhancement processing step).

Then, the inverse transformation unit 43 performs coordinate transformation which is the inverse of the coordinate transformation in Step S12 for the image subjected to the resolution enhancement process to generate an inversely-transformed image if necessary (Step S14: an inverse transformation step).

Next, the process from Step S12 to Step S14 will be described in detail.

<Coordinate Transformation Process>

Figure 7A:
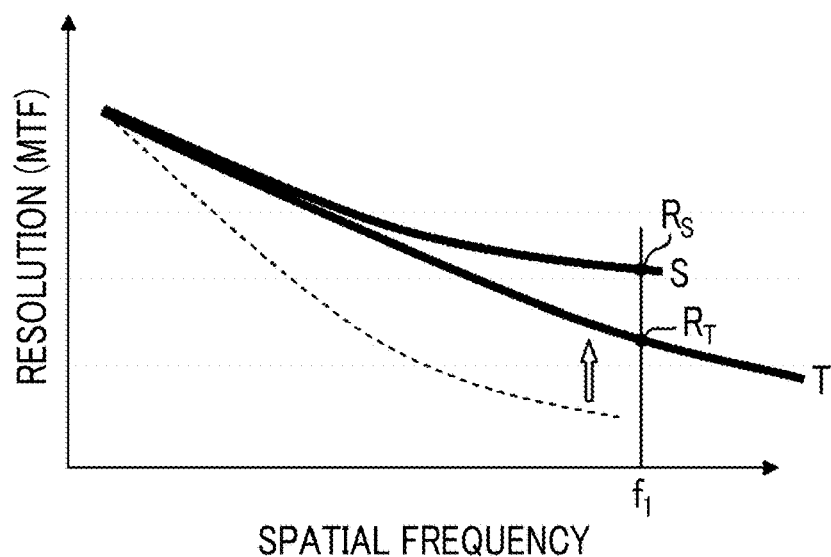
FIGS. 7A and 7C are diagrams illustrating an example of the resolution of the captured image.

The coordinate transformation in Step S12 will be described. As illustrated in FIG. 5, in a case in which the resolution S of the captured image 51 in the sagittal direction is higher than the resolution T of the captured image 51 in the tangential direction, a peripheral portion of the captured image 51 is compressed by the amount of compression corresponding to an image height. This process can be performed on the basis of the information of the resolutions acquired in Step S11. Then, as illustrated in FIG. 7A, the tangential resolution T increases in appearance (in FIG. 7A, the tangential resolution T before coordinate transformation is represented by a dotted line) and is close to the sagittal resolution S. In this aspect, since the captured image 51 is compressed, the kernel size of a restoration filter F (see FIGS. 10 to 12) which is applied after the coordinate transformation is reduced, which makes it possible to perform a process at a high speed.

In the coordinate transformation in Step S12, the coordinate transformation unit 41 sets the direction and amount of coordinate transformation such that the lower of the sagittal resolution and the tangential resolution after coordinate transformation at a given spatial frequency is equal to or greater than 0.5, preferably equal to or greater than 0.75 (in a case in which the resolution is represented by MTF) in a case in which the higher of the sagittal resolution and the tangential resolution is 1.0. For example, in a case in which the sagittal and tangential resolutions after coordinate transformation at a spatial frequency $f_1$ are $R_S$ and $R_T$ ($<R_S$), respectively, and $R_S$ is 1, the coordinate transformation unit 41 sets the direction and amount of coordinate transformation such that $R_T$ is equal to or greater than 0.5, preferably equal to or greater than 0.75. The reason why these values are used is that, in a case in which the resolution ratio is within the above-mentioned range, the rotationally-symmetric resolution enhancement process is performed for the coordinate-transformed image 52, which will be described below.

Figure 7B:
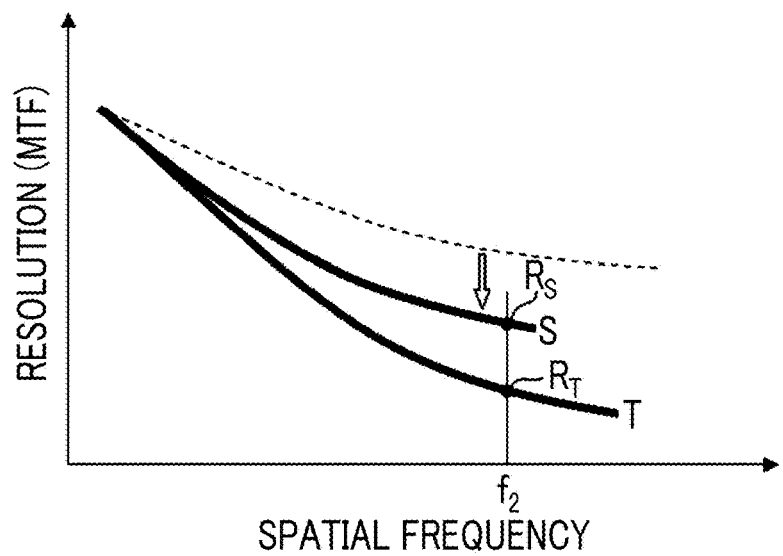

In a case in which the resolution of the captured image 51 is in the state illustrated in FIG. 5, a central portion of the captured image 51 may be expanded by the amount of expansion corresponding to the image height in the coordinate transformation in Step S12. This process can be performed on the basis of the information of the resolutions acquired in Step S11. In this case, in the coordinate-transformed image 52, the sagittal resolution S is reduced in appearance as illustrated in FIG. 7B (in FIG. 7B, the sagittal resolution S before coordinate transformation is represented by a dotted line) and is close to the tangential resolution T. In a case in which the sagittal and tangential resolutions after coordinate transformation at a spatial frequency $f_2$ are $R_S$ and $R_T$ ($<R_S$), respectively, and $R_S$ is 1, the coordinate transformation unit 41 sets the direction and amount of coordinate transformation such that $R_T$ is equal to or greater than 0.5, preferably equal to or greater than 0.75. Even in a case in which the coordinate transformation is performed, the rotationally-symmetric resolution enhancement process is performed for the coordinate-transformed image 52 since the sagittal resolution S and the tangential resolution T are close to each other.

Figure 7C:
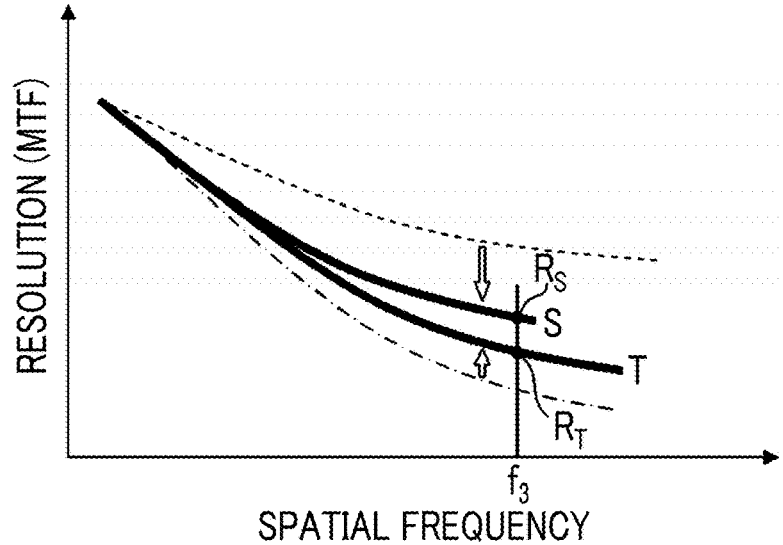

In the example illustrated in FIG. 5, in Step S12, both the coordinate transformation for compressing the peripheral portion of the captured image 51 by the amount of compression corresponding to the image height and the coordinate transformation for expanding the central portion of the captured image 51 by the amount of expansion corresponding to the image height may be performed. In this case, in the coordinate-transformed image 52, as illustrated in FIG. 7C, the tangential resolution T is improved in appearance and the sagittal resolution S is reduced in appearance such that the sagittal resolution S and the tangential resolution T are close to each other (in FIG. 7C, the sagittal resolution S before coordinate transformation is represented by a dotted line and the tangential resolution T before coordinate transformation is a chain line). In this case, similarly to FIGS. 7A and 7B, assuming that the sagittal and tangential resolutions after coordinate transformation at a spatial frequency $f_3$ are $R_S$ and $R_T$ ($<R_S$), respectively, and $R_S$ is 1, the coordinate transformation unit 41 sets the direction and amount of coordinate transformation such that $R_T$ is equal to or greater than 0.5, preferably equal to or greater than 0.75.

It is preferable that the sagittal resolution S and the tangential resolution T are exactly equal to each other by the coordinate transformation in Step S12. However, in a case in which the resolutions are not exactly equal to each other by the coordinate transformation, but are close to each other, the effect of the invention is obtained according to the degree of the closeness.

<Resolution Values by Image Simulation>

The verification results of an image simulation for the values of the sagittal and tangential resolutions after the coordinate transformation in Step S12 are illustrated. In the simulation, images were generated in a case in which the relationship between resolutions at a "(½)×Nyquist frequency" after the above-mentioned coordinate transformation satisfied conditions 1 to 5 (see a table illustrated in FIG. 8) in a state in which the thickness of characters "Fujifilm" (original image) was about two pixels on the imaging element and the resolution (MTF) of the captured image was reduced by the astigmatism of the imaging lens. As a result, as can be seen from the table illustrated in FIG. 8, in conditions 1 to 3 in which the relationship between the resolutions after the coordinate transformation satisfies the above-mentioned numerical range, it is difficult to perceive the direction of blur in the coordinate-transformed image (the shape of the blur is a circle or is close to a circle) and the rotationally-symmetric resolution enhancement process is performed for the coordinate-transformed image.

Different axes (directions) are defined in the imaging lens 16 and the captured image 51. In the image simulation illustrated in the table of FIG. 8, "a region in which an H (horizontal) direction of the captured image 51 was aligned with an Sa (sagittal) direction of the imaging lens 16 and a V (vertical) direction of the captured image 51 was aligned with a Ta (tangential) direction of the imaging lens 16" (a region in the vicinity of a region 51a in FIG. 9) was extracted from the captured image 51. Then, the image simulation was performed for the extracted region.

<Correction of Distortion Component by Coordinate Transformation>

There is a difference between the sagittal resolution S and the tangential resolution T as illustrated in FIG. 5 and the captured image 51 has a distortion component caused by the distortion of the imaging lens 16 as illustrated in FIG. 4B.

Figure 4C:
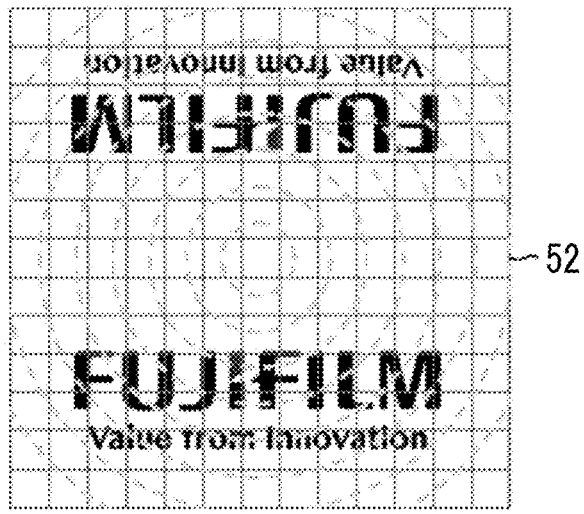

For this reason, it is preferable that the information of the distortion of the imaging lens 16 is acquired in Step S11 and the above-mentioned coordinate transformation (at least one of the compression of the peripheral portion or the expansion of the central portion) is performed considering the information of the distortion in Step S12. In this case, the distortion (distortion component) of the coordinate-transformed image 52 after the coordinate transformation is corrected as illustrated in FIG. 4C and the distortion of the imaging lens 16 can also be corrected by the coordinate transformation for making the sagittal resolution S and the tangential resolution T close to each other.

<Point Image Restoration Process (Restoration Process)>

Figure 10:
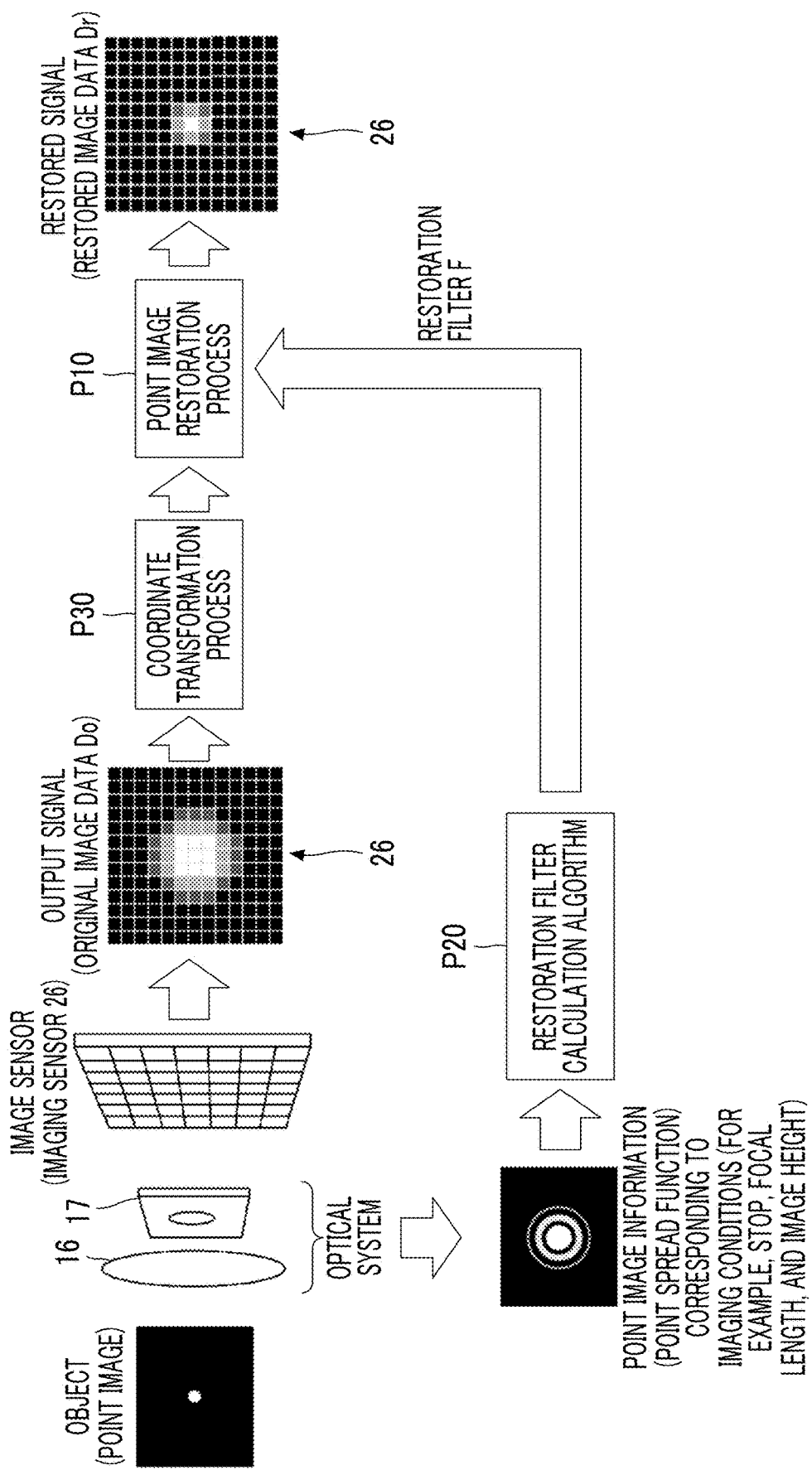
FIG. 10 is a diagram schematically illustrating a process from the capture of an image to a point image restoration process.

FIG. 10 is a diagram schematically illustrating a process from the capture of an image to the point image restoration process (restoration process). In a case in which a point image is captured as the image of the object, an object image is formed on the imaging element 26 (image sensor) by the optical system (for example, the imaging lens 16 and the stop 17) and original image data Do (corresponding to the captured image 51) is output from the imaging element 26. The original image data Do is changed to image data in which the original object image is blurred by a point spread phenomenon that results from the characteristics of the optical system. A coordinate transformation process P30 (Step S12 in FIG. 6) is performed for the original image data. In the coordinate-transformed image 52 after the coordinate transformation, asymmetric blur components are corrected by the coordinate transformation process, but point-symmetric blur components remain. For this reason, in order to restore the original object image (point image) from the coordinate-transformed image 52, a point image restoration process P10 (a resolution enhancement process; Step S13 in FIG. 6) using a restoration filter F is performed for the coordinate-transformed image 52 to obtain restored image data Dr indicating an image (restored image) close to the original object image (point image). Inverse transformation process (Step S14 in FIG. 6) is performed for the restored image data Dr if necessary, which will be described in detail below.

The restoration filter F used in the point image restoration process P10 is obtained from the point image information (point spread function) of the optical system corresponding to the imaging conditions when the original image data Do is acquired by a restoration filter calculation algorithm P20. The point image information (point spread function) of the optical system varies depending on various imaging conditions, such as the amount of opening of the stop, a focal length, a zoom amount, an image height, the number of recording pixels, and a pixel pitch, in addition to the type of imaging lens 16. Therefore, the imaging conditions are acquired when the restoration filter F is calculated.

<Example of Point Image Restoration Process>

Figure 11:
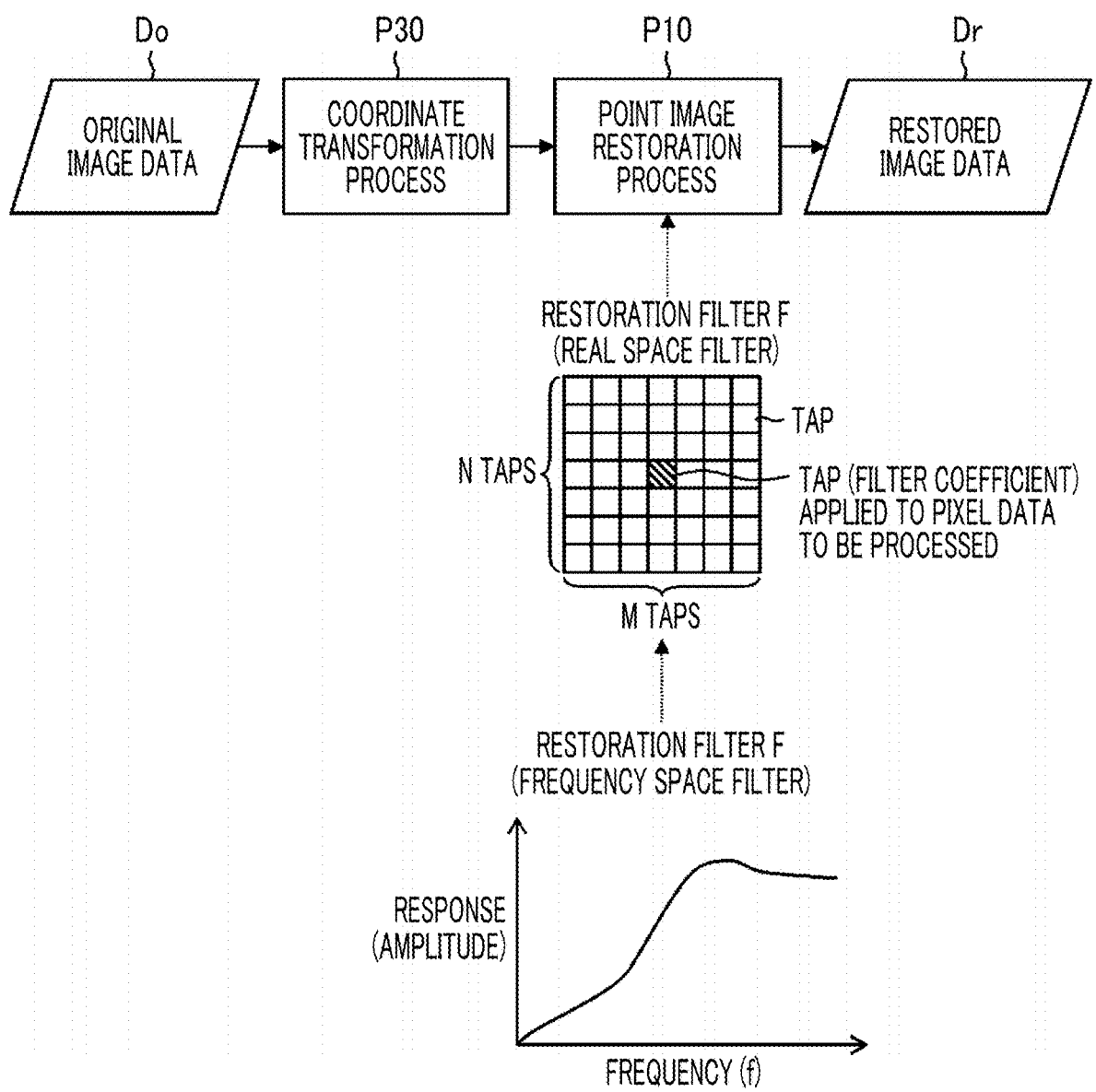
FIG. 11 is a block diagram illustrating an example of the point image restoration process.

FIG. 11 is a block diagram illustrating an example of the point image restoration process. The point image restoration process P10 (resolution enhancement process) is a process of creating the restored image data Dr from the coordinate-transformed image 52 with a filtering process using the restoration filter F, as described above. For example, the restoration filter F having N×M (N and M are an integer equal to or greater than 2) taps in a real space is applied to the image (image data) to be processed. Then, weighted averaging (deconvolution) can be performed for filter coefficients allocated to each tap and corresponding pixel data (pixel data to be processed and adjacent pixel data in the coordinate-transformed image 52) to calculate pixel data (restored image data Dr) after the point image restoration process. The point image restoration process can be performed by applying the weighted averaging process using the restoration filter F to all pixel data forming the image (image data) while sequentially changing target pixels.

The restoration filter having N×M taps in the real space can be derived by performing inverse Fourier transform for the restoration filter in the frequency space. Therefore, the restoration filter in the rear space can be appropriately calculated by specifying a restoration filter in a fundamental frequency space and designating the number of taps forming the restoration filter in the real space.

An example of the restoration filter F is illustrated in FIG. 12A. The restoration filter F is designed so as to be rotationally symmetric with respect to the center of the kernel and can reduce the amount of data stored in the memory. For example, in the case of 7×7 kernels illustrated in FIG. 12A, a 4×4 restoration filter G illustrated in FIG. 12B is stored and the symmetry of the restoration filter can be used to obtain a 7×7 restoration filter F.

The resolution enhancement processing unit 42 performs the point image restoration process for the coordinate-transformed image 52 using the restoration filter F. Since the point image restoration process (restoration process) is performed for the coordinate-transformed image 52 in which the sagittal resolution S and the tangential resolution T are close to each other by the coordinate transformation using the rotationally-symmetric restoration filter F, a calculation load can be less than that in a case in which the point image restoration process is performed for the captured image 51 (which is not subjected to the coordinate transformation and has a large difference between the sagittal resolution S and the tangential resolution T as illustrated in FIG. 5) using the rotationally-symmetric restoration filter and it is possible to effectively obtain a high-quality restored image.

In a case in which the magnitude relationship between the sagittal resolution S and the tangential resolution T varies depending on the image height of the imaging lens 16 or the position in the captured image 51, it is preferable to perform coordinate transformation for compressing the image in a region in which the sagittal resolution S is larger (higher) and expanding the image in a region in which the tangential resolution T is larger (higher).

<Other Resolution Enhancement Processes>

The resolution enhancement process performed by the resolution enhancement processing unit 42 is not particularly limited as long as it enhances the resolution of the coordinate-transformed image 52 (suppresses blur). The resolution enhancement processing unit 42 may perform a contour enhancement process for the brightness value of the coordinate-transformed image 52 using a contour enhancement filter, in addition to the above-mentioned point image restoration process (restoration process). In addition, the resolution enhancement processing unit 42 can perform the resolution enhancement process for an RGB image before a demosaicing process. In this case, the resolution enhancement process is performed for the coordinate-transformed RGB image.

A case in which the resolution enhancement processing unit 42 performs the contour enhancement process as the resolution enhancement process will be described. In the contour enhancement process performed by the resolution enhancement processing unit 42, similarly to the restoration process, weighted averaging (deconvolution) can be performed for filter coefficients allocated to each tap of a contour enhancement filter and pixel data to calculate pixel data after the contour enhancement process. Then, it is possible to perform the contour enhancement process by applying a weighted averaging process using the contour enhancement filter for all pixel data forming the image data while sequentially changing target pixels. The contour enhancement filter is created by a known method. In the invention, the contour enhancement process as the resolution enhancement process includes a process called an edge enhancement process or a sharpness enhancement process.

<Inverse Transformation Process>

Figure 13A:
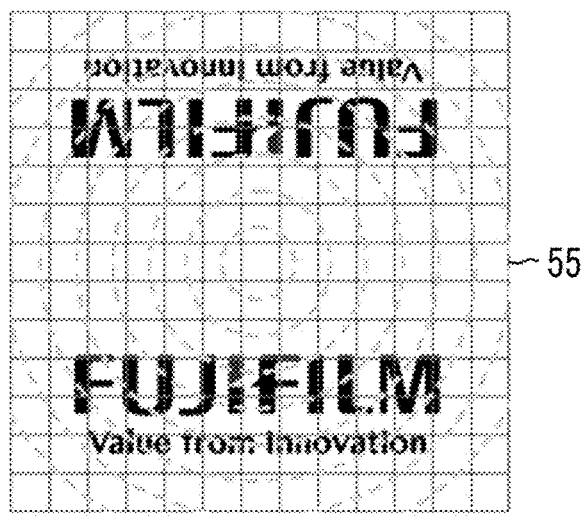
FIGS. 13A to 13C are diagrams schematically illustrating an object image and a captured image.
Figure 13B:
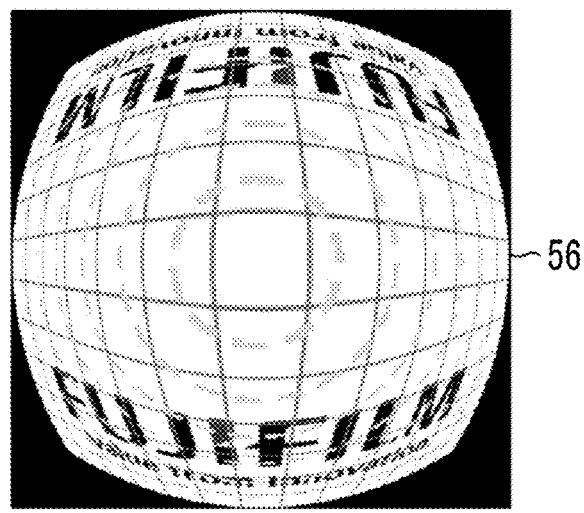
Figure 13C:
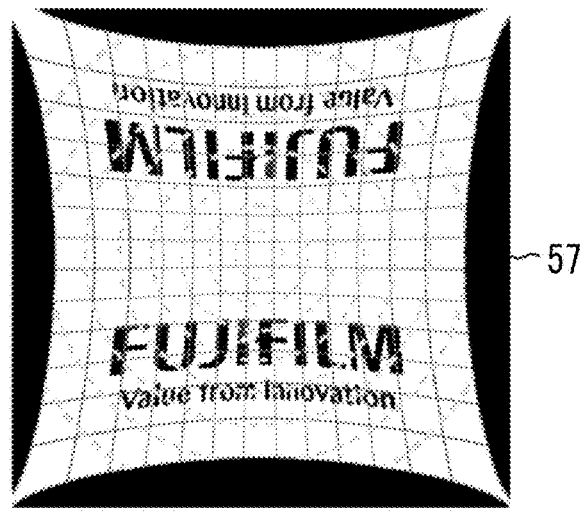

The inverse transformation unit 43 performs inverse transformation of the coordinate transformation in Step S12 for the restored image (resolution-enhanced image) to generate an inversely-transformed image (Step S14 in FIG. 6). The inversely-transformed image has the same configuration as the captured image 51 and has been subjected to the resolution enhancement process. In a case in which the distortion of the lens can be sufficiently corrected by the coordinate transformation in Step S12 or in a case in which the captured image 51 includes few distortion components, the inverse transformation in Step S14 may not be performed. In a case in which a distortion component is added by the coordinate transformation, the inverse transformation may be performed. For example, in a case in which an image, such as the captured image 51 (see FIGS. 4A to 4C) or a captured image 53 (see FIG. 15), is changed to the coordinate-transformed image 52 by the coordinate transformation, that is, in a case in which a distortion component of the image is corrected (removed) by the coordinate transformation, it is not necessary to perform the inverse transformation. In a case in which a distortion component is added to a captured image 55 having few distortion components as illustrated in FIG. 13A by the coordinate transformation and coordinate-transformed images 56 and 57 illustrated in FIGS. 13B and 13C are obtained, the inverse transformation may be performed.

Example 2

Figure 14:
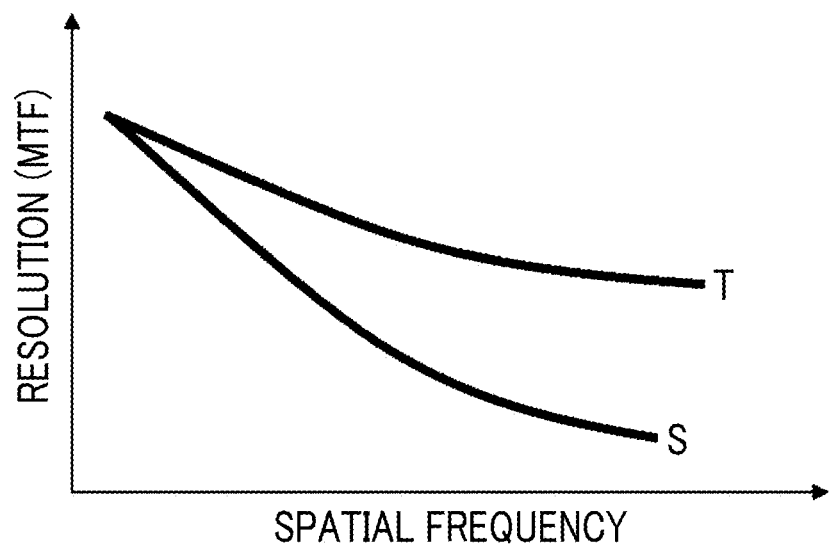
FIG. 14 is a diagram illustrating the resolution of the captured image.
Figure 15:
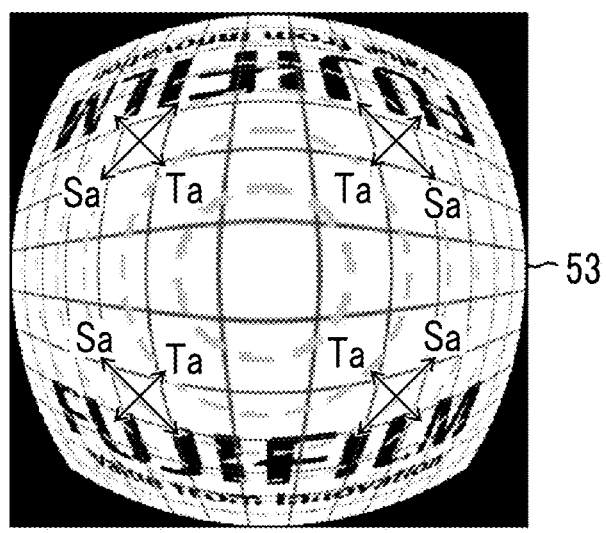
FIG. 15 is a diagram schematically illustrating the captured image.

Next, a case in which the relationship between the sagittal resolution S and the tangential resolution T is different from that in Example 1 will be described. In Example 1, the case in which the sagittal resolution S is higher than the tangential resolution T as illustrated in FIG. 5 has been described. In Example 2, on the contrary, a case in which the tangential resolution T is higher than the sagittal resolution S in the captured image will be described. FIG. 14 is a diagram illustrating resolutions in the case. In this case, it is assumed that the captured image 53 has barrel distortion (distortion is negative) as illustrated in FIG. 15. In Example 2, the configuration of the digital camera 10 and the procedure of a process may be the same as those in Example 1.

Figure 16A:
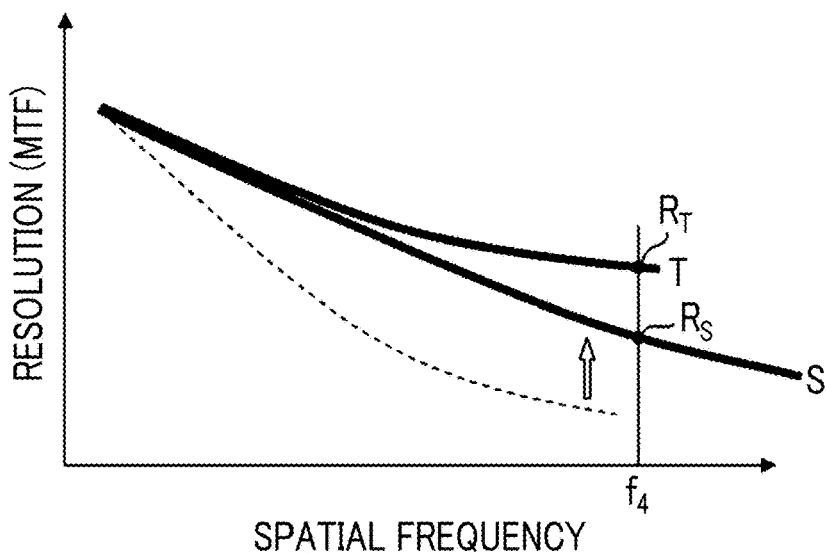
FIGS. 16A to 16C are diagrams illustrating a change of resolution by coordinate transformation.
Figure 16B:
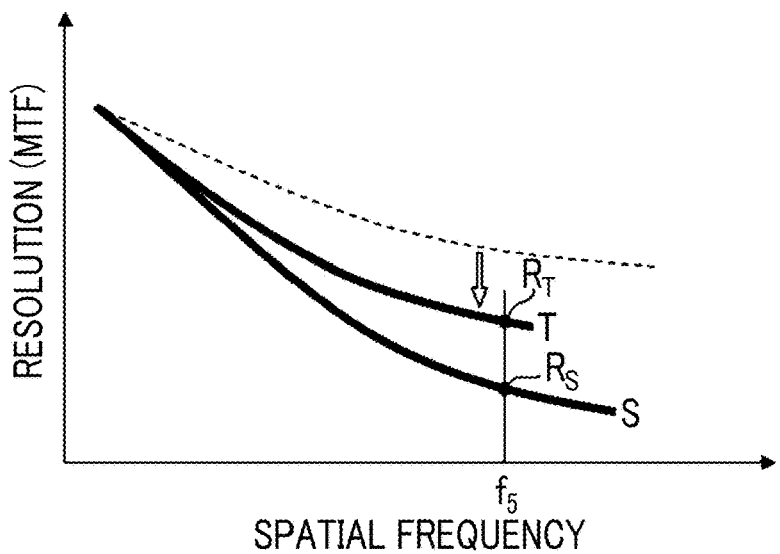
Figure 16C:
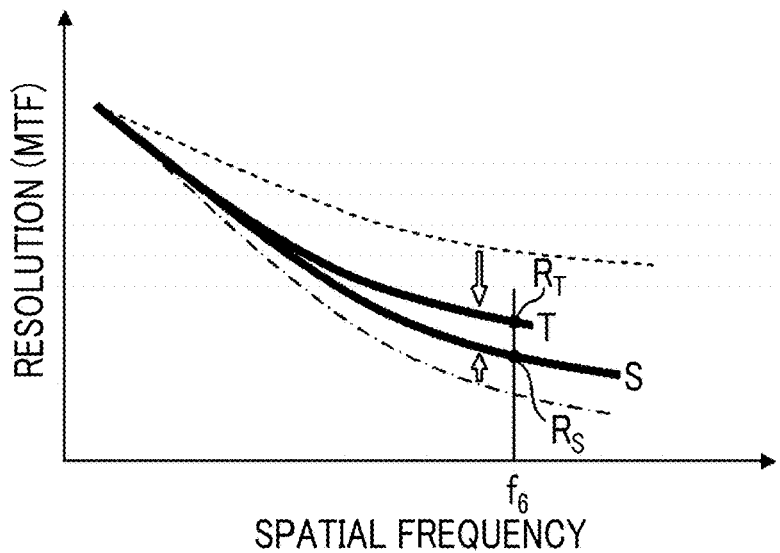

In a case in which the captured image 53 has the characteristics illustrated in FIG. 14 and FIG. 15, a coordinate transformation process for increasing the sagittal resolution S (compressing a central portion of the captured image) may be performed as illustrated in FIG. 16A, a coordinate transformation process for decreasing the tangential resolution T (expanding a peripheral portion of the captured image) may be performed as illustrated in FIG. 16B, or both the coordinate transformation processes may be performed as illustrated in FIG. 16C. At that time, as illustrated in FIGS. 16A to 16C, in a case in which the sagittal and tangential resolutions after coordinate transformation at spatial frequencies $f_4$ to $f_6$ are $R_S$ and $R_T$ ($>R_S$), respectively, and $R_T$ is 1, the direction and amount of coordinate transformation are set such that $R_S$ is equal to or greater than 0.5, preferably equal to or greater than 0.75.

Since the sagittal resolution S is close to the tangential resolution T by the coordinate transformation, it is possible to perform a rotationally-symmetric resolution enhancement process for the coordinate-transformed image and to effectively obtain a high-quality restored image, similarly to Example 1. In addition, the distortion of the imaging lens 16 is corrected by the coordinate transformation. In Example 2, similarly to Example 1, it is possible to perform inverse transformation if necessary.

As described in Examples 1 and 2, in the first embodiment, coordinate transformation is performed for the captured image 51 to make the sagittal resolution S and the tangential resolution T close to each other in the coordinate-transformed image 52 and the rotationally-symmetric resolution enhancement process is performed for the coordinate-transformed image 52. Therefore, it is possible to prevent an increase in the calculation load of the resolution enhancement process and to effectively obtain a high-quality restored image.

Second Embodiment

Next, a second embodiment of the invention will be described. In some cases, in an imaging lens, the magnitude relationship between the sagittal resolution S and the tangential resolution T varies depending on the spatial frequency. In this case, only the coordinate transformation may be insufficient to make the resolutions close to each other in the entire spatial frequency range. Therefore, in the second embodiment, a specific spatial frequency or a spatial frequency range with a width is designated and coordinate transformation is performed at the spatial frequency such that the resolutions are close to each other. In the second embodiment, the configuration of an image processing apparatus (digital camera 10) or the procedure of a process may be the same as that in the first embodiment.

Figure 17:
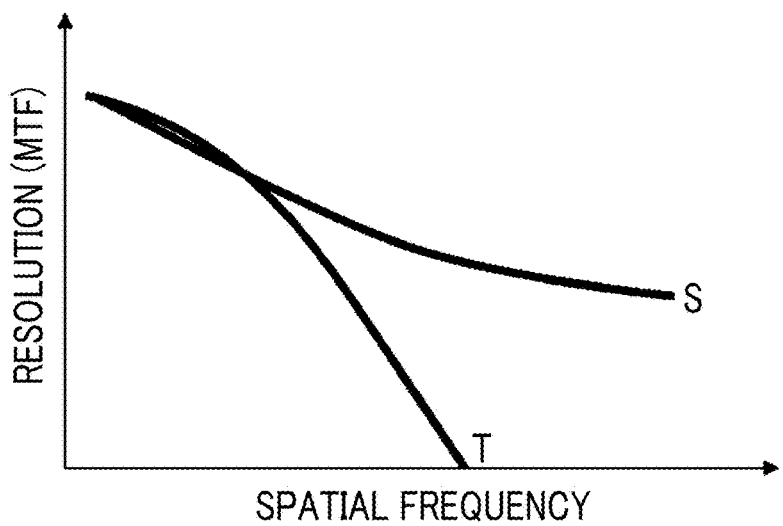
FIG. 17 is a diagram illustrating an example of the resolution of a captured image in a second embodiment of the invention.

FIG. 17 illustrates an example of a situation in which the magnitude relationship between the sagittal resolution S and the tangential resolution T varies depending on the spatial frequency. In this example, the sagittal resolution S and the tangential resolution T are substantially equal to each other in a region in which the spatial frequency is low and the difference between the resolutions increases as the spatial frequency increases. In this example, it is assumed that the distortion of the imaging lens 16 is positive (the image of the object 50 is captured to obtain the captured image 51 as in FIGS. 4A and 4B).

Figure 18A:
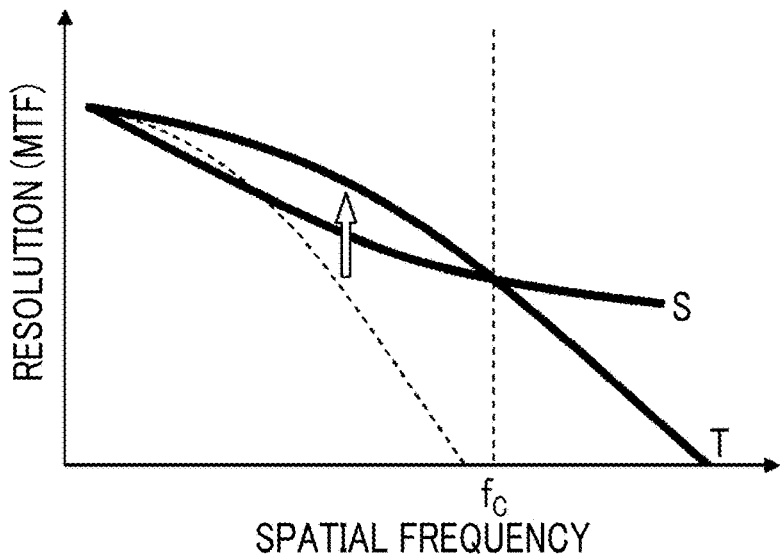
FIGS. 18A and 18B are diagrams illustrating a change of resolution by coordinate transformation.

An example in which the resolutions are close to each other at a specific spatial frequency in the situation illustrated in FIG. 17 will be described. FIG. 18A illustrates an example in which coordinate transformation for compressing a peripheral portion of the captured image 51 according to an image height is performed for the captured image 51 to increase the tangential (in appearance) resolution T such that the sagittal resolution S and the tangential resolution T are equal to each other at a spatial frequency $f_C$. Since the sagittal resolution S and the tangential resolution T are equal to each other by the coordinate transformation, it is possible to perform the rotationally-symmetric resolution enhancement process for the coordinate-transformed image and to obtain a high-quality restored image, similarly to the first embodiment. In addition, the distortion of the imaging lens 16 is corrected by the coordinate transformation.

Figure 18B:
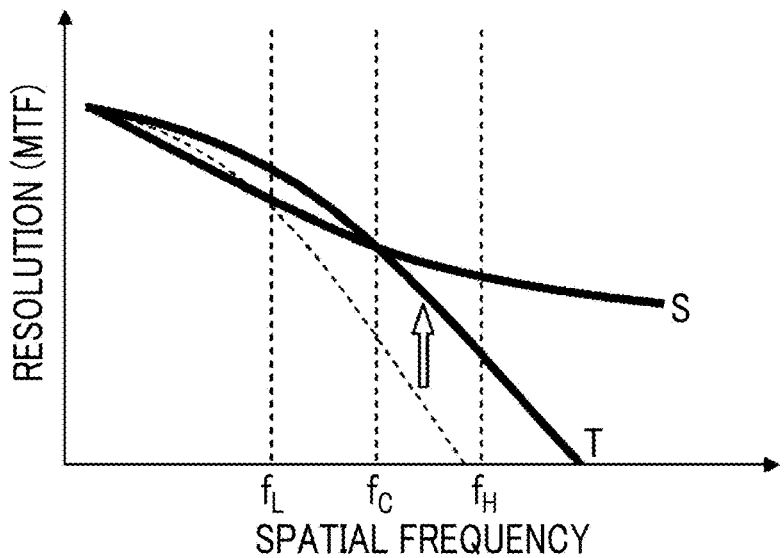

Next, an example in which the resolutions are close to each other in the spatial frequency range with a width will be described. FIG. 18B illustrates an example in which coordinate transformation for compressing the peripheral portion of the captured image 51 according to the image height is performed for the captured image 51 to increase the tangential (in appearance) resolution T such that the sagittal resolution S and the tangential resolution T are close to each other in the range of a spatial frequency $f_L$ to a spatial frequency $f_H$ (the sagittal resolution S and the tangential resolution T are equal to each other at the spatial frequency $f_C$).

In the case in which the resolutions are close to each other at a specific spatial frequency or in a spatial frequency range with a width as illustrated in FIGS. 18A and 18B, fixed values may be designated as the spatial frequencies $f_C$, $f_L$, and $f_H$ or different values may be designated according to the type of image or the purpose of use. For example, coordinate transformation can be performed such that the sagittal resolution S and the tangential resolution T are closest to each other at a spatial frequency (the spatial frequency $f_L=(\frac{1}{4})\times$Nyquist frequency and the spatial frequency $f_H=(\frac{1}{2})\times$Nyquist frequency) in the range of the Nyquist frequency of the sensor (imaging element 26)$\times(\frac{1}{4}$ to $\frac{1}{2})$ which is a frequency generally important in image quality and are equal to each other at a spatial frequency (spatial frequency $f_C$) of Nyquist frequency$\times\frac{1}{3}$. In addition, the Nyquist frequency (lines/mm) of the sensor=($\frac{1}{2}$)/sensor pitch (mm) is established.

The values of the spatial frequencies $f_C$, $f_L$, and $f_H$ may not be designated by the user, but may be designated by the image processing unit 35 (coordinate transformation unit 41). Alternatively, the values input by the user through the user interface 29 may be designated as the spatial frequencies.

The case in which coordinate transformation for compressing the peripheral portion of the image according to the image height is performed to increase the tangential resolution T has been described with reference to FIG. 17 and FIGS. 18A and 18B. Similarly to the first embodiment, coordinate transformation for expanding the central portion of the image according to the image height may be performed to decrease the sagittal (in appearance) resolution S. In addition, both the coordinate transformation for compressing the peripheral portion of the image according to the image height and the coordinate transformation for expanding the central portion of the image according to the image height may be performed (to decrease the sagittal resolution S and to increase the tangential resolution T). Furthermore, in the coordinate transformation, in a case in which the higher of the sagittal resolution S and the tangential resolution T is 1, the coordinate transformation is preferably performed at spatial frequencies other than $f_C$ such that the lower of the resolutions is equal to or greater than 0.5, preferably equal to or greater than 0.75, similarly to the first embodiment.

In the example illustrated in FIG. 17 and FIGS. 18A and 18B, the case in which the sagittal resolution S is higher than the tangential resolution T in the substantially entire spatial frequency and distortion is positive has been described. However, in a case in which the magnitude relationship between the resolutions is contrary to that in the example (a case in which the tangential resolution T is higher than the sagittal resolution S and the distortion is negative as illustrated in FIG. 14 and FIG. 15), at least one of the compression of the peripheral portion of the image or the expansion of the central portion of the image may be performed.

In the second embodiment, similarly to the first embodiment, inverse transformation may be performed if necessary.

Modification Examples

Each configuration and each function of the first and second embodiments can be appropriately implemented by any hardware, any software, or a combination thereof. For example, the invention can be applied to a program that causes a computer to perform the above-mentioned processing steps (process procedures), a computer-readable recording medium (non-transitory recording medium) on which the program is recorded, or a computer in which the program can be installed.

FIG. 19 is a block diagram illustrating a case in which the invention is applied to a computer. In the example illustrated in FIG. 19, a computer 90 includes an image acquisition unit 92, an information acquisition unit 94, a coordinate transformation unit 96, a resolution enhancement processing unit 98, and an inverse transformation unit 99 which have the same configuration and function as the image acquisition unit 40, the information acquisition unit 44, the coordinate transformation unit 41, the resolution enhancement processing unit 42, and the inverse transformation unit 43 of the digital camera 10, respectively. The computer 90 can perform the same coordinate transformation, resolution enhancement process, and inverse transformation as the digital camera 10. It is possible to reduce the calculation load of the resolution enhancement process and to effectively obtain a high-quality restored image.

In addition, non-transitory recording media including a magneto-optical recording medium, such as a compact disk (CD) or a digital versatile disk (DVD), and various semiconductor memories can be used as a recording medium on which the program is recorded.

Third Embodiment

Next, a case in which the image processing apparatus according to the invention is applied to a smart phone will be described.

<Configuration of Smart Phone>

Figure 20:
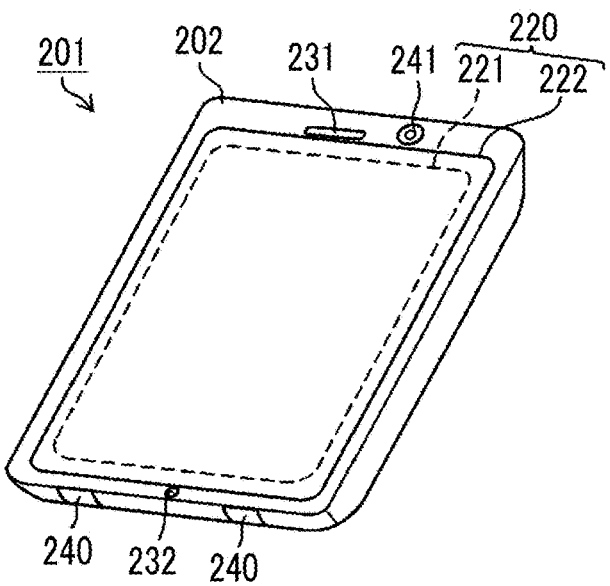
FIG. 20 is a diagram illustrating the outward appearance of a smart phone according to a third embodiment of the invention.

FIG. 20 illustrates the outward appearance of a smart phone 201 according to a third embodiment. The smart phone 201 illustrated in FIG. 20 includes a housing 202 with a flat panel shape. The smart phone 201 includes a display input unit 220 having a display panel 221 as a display unit and an operation panel 222 as an input unit which are integrally formed on one surface of the housing 202. The housing 202 includes a speaker 231, a microphone 232, an operation unit 240, and a camera unit 241 (optical system). However, the configuration of the housing 202 is not limited thereto. For example, the display unit and the input unit may be independently provided or the housing 202 may have a folding structure or a sliding structure.

Figure 21:
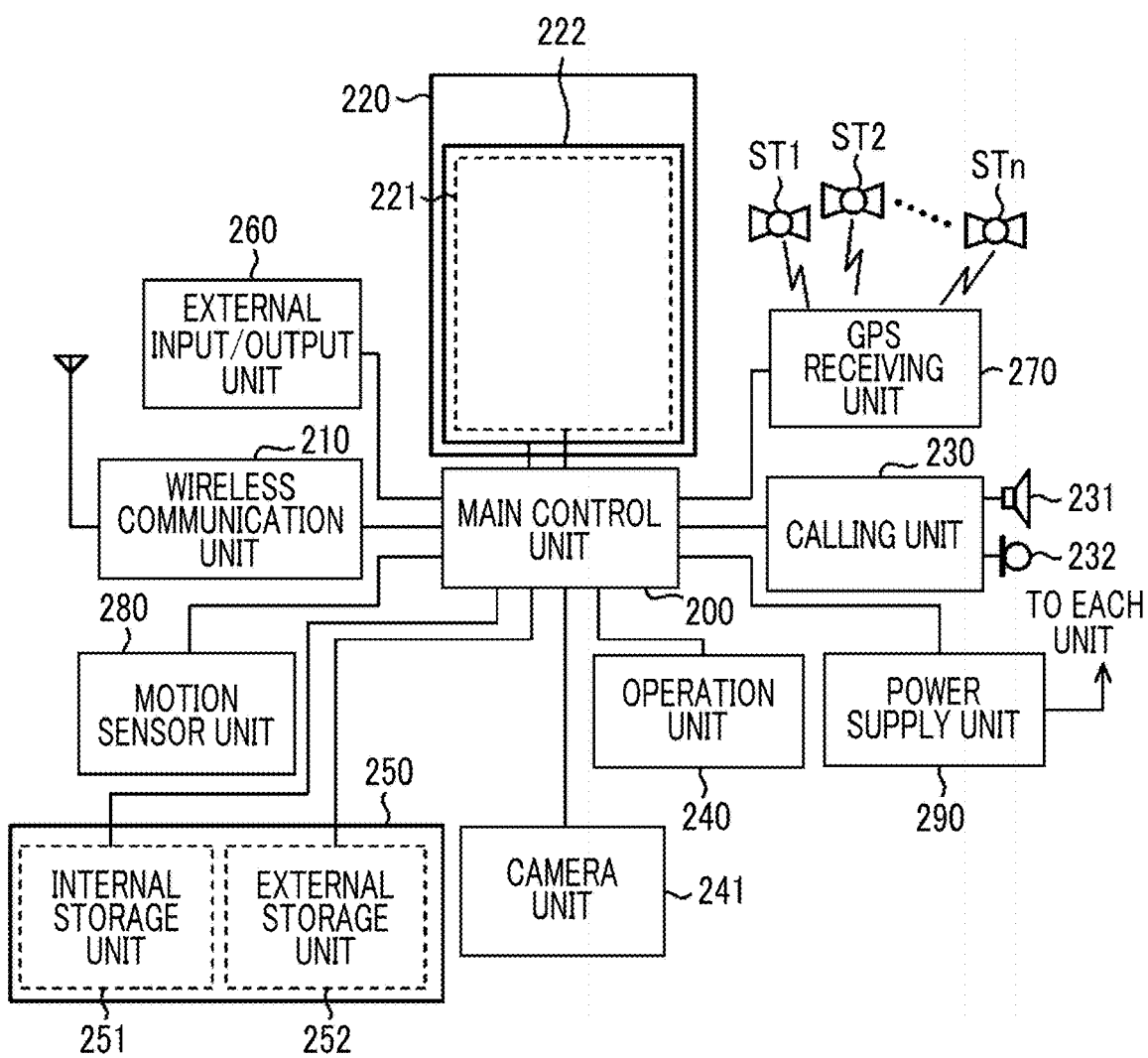
FIG. 21 is a block diagram illustrating the configuration of the smart phone.

FIG. 21 is a block diagram illustrating the configuration of the smart phone 201 illustrated in FIG. 20. As illustrated in FIG. 21, the smart phone 201 includes, as main components, a wireless communication unit 210, the display input unit 220, a calling unit 230, the operation unit 240, the camera unit 241, a storage unit 250, an external input/output unit 260, a global positioning system (GPS) receiving unit 270, a motion sensor unit 280, a power supply unit 290, and a main control unit 200 (an image acquisition unit, a coordinate transformation unit, a resolution enhancement processing unit, an information acquisition unit, and an inverse transformation unit). In addition, the smart phone 201 has, as a main function, a wireless communication function which performs mobile wireless communication through a base station apparatus and a mobile communication network.

The wireless communication unit 210 performs wireless communication with the base station apparatus which is accommodated in the mobile communication network in response to a command from the main control unit 200. The wireless communication is used to transmit and receive various types of file data, such as voice data and image data, and electronic mail data or to receive, for example, web data or streaming data.

The display input unit 220 is a so-called touch panel including the display panel 221 and the operation panel 222. The display input unit 220 displays, for example, images (still images and motion pictures) or text information to visually transmit information to the user and detects the user's operation for the displayed information under the control of the main control unit 200.

The display panel 221 uses, for example, a liquid crystal display (LCD) or an organic electro-luminescence display (OELD) as a display device. The operation panel 222 is a device that is provided such that an image displayed on a display surface of the display panel 221 can be visually recognized and detects one or a plurality of coordinate points operated by a finger of the user or a stylus. In a case in which the device is operated by a finger of the user or a stylus, the operation panel 222 outputs a detection signal which is generated by the operation to the main control unit 200. Then, the main control unit 200 detects an operation position (coordinates) on the display panel 221 on the basis of the received detection signal.

As illustrated in FIGS. 20 and 21, the display panel 221 and the operation panel 222 of the smart phone 201 are integrated to form the display input unit 220 and the operation panel 222 is provided so as to completely cover the display panel 221. In a case in which this arrangement is used, the operation panel 222 may have a function of detecting the user's operation even in a region other than the display panel 221. In other words, the operation panel 222 may include a detection region (hereinafter, referred to as a "display region") for an overlap portion which overlaps the display panel 221 and a detection region (hereinafter, referred to as a "non-display region") for an outer edge portion which does not overlap the display panel 221.

The size of the display region may be exactly equal to the size of the display panel 221. However, the sizes are not necessarily equal to each other. The operation panel 222 may include two sensitive regions, that is, an outer edge portion and an inner portion other than the outer edge portion. The width of the outer edge portion is appropriately designed according to, for example, the size of the housing 202. Examples of a position detection method which is used in the operation panel 222 include a matrix switching method, a resistive film method, a surface elastic wave method, an infrared method, an electromagnetic induction method, and a capacitive sensing method. Any of the methods may be used.

The calling unit 230 includes the speaker 231 and the microphone 232. The calling unit 230 converts the voice of the user which is input through the microphone 232 into voice data which can be processed by the main control unit 200 and outputs the converted voice data to the main control unit 200. In addition, the calling unit 230 decodes voice data received by the wireless communication unit 210 or the external input/output unit 260 and outputs the decoded voice data from the speaker 231. As illustrated in FIG. 20, for example, the speaker 231 can be mounted on the same surface as the display input unit 220 and the microphone 232 can be mounted on the side surface of the housing 202.

The operation unit 240 is a hardware key which uses, for example, a key switch and receives commands from the user. For example, as illustrated in FIG. 20, the operation unit 240 is a push button switch which is mounted on the side surface of the housing 202 of the smart phone 201, is turned on in a case in which it is pressed by, for example, a finger, and is turned off by the restoring force of a spring in a case in which the finger is taken off.

The storage unit 250 stores a control program or control data of the main control unit 200, application software, address data which is associated with, for example, the names or phone numbers of communication partners, transmitted and received electronic mail data, web data which is downloaded by web browsing, or downloaded content data. In addition, the storage unit 250 temporarily stores, for example, streaming data. The storage unit 250 includes an internal storage unit 251 which is provided in the smart phone and an external storage unit 252 which has a slot for a detachable external memory. Each of the internal storage unit 251 and the external storage unit 252 forming the storage unit 250 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 260 functions as an interface with all of the external apparatuses connected to the smart phone 201 and is directly or indirectly connected to other external apparatuses by communication (for example, a universal serial bus (USB) or Institute of Electrical and Electronics Engineers (IEEE) 1394) or a network (for example, the Internet, a wireless LAN, a Bluetooth (registered trademark) network, a radio frequency identification (RFID) network, an Infrared Data Association (IrDA) (registered trademark) network, an Ultra Wideband (UWB) (registered trademark) network, or a ZigBee (registered trademark) network).

Examples of the external apparatus connected to the smart phone 201 include a wired/wireless headset, a wired/wireless external charger, a wired/wireless data port, a memory card or a subscriber identity module (SIM)/user identity module (UIM) card which is connected through a card socket, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a PDA which is connected wirelessly or in a wired manner, and an earphone. The external input/output unit may transmit data received from the external apparatus to each component of the smart phone 201 or may transmit data in the smart phone 201 to the external apparatus.

The GPS receiving unit 270 receives GPS signals transmitted from GPS satellites ST1 to STn and performs a position measurement process on the basis of a plurality of received GPS signals to detect a position including the latitude, longitude, and height of the smart phone 201, in response to a command from the main control unit 200. In a case in which the GPS receiving unit 270 can acquire positional information from the wireless communication unit 210 and/or the external input/output unit 260 (for example, a wireless LAN), the GPS receiving unit 270 can detect the position using the positional information.

The motion sensor unit 280 includes, for example, a triaxial acceleration sensor and detects the physical movement of the smart phone 201 in response to a command from the main control unit 200. The physical movement of the smart phone 201 is detected to detect the moving direction or acceleration of the smart phone 201. The detection result is output to the main control unit 200.

The power supply unit 290 supplies power accumulated in a battery (not illustrated) to each unit of the smart phone 201 in response to a command from the main control unit 200.

The main control unit 200 includes a microprocessor, operates on the basis of the control program or control data stored in the storage unit 250, and controls the overall operation of each unit of the smart phone 201. The main control unit 200 has an application processing function and a mobile communication control function of controlling each unit of a communication system in order to perform voice communication or data communication through the wireless communication unit 210.

The application processing function is implemented by the operation of the main control unit 200 based on the application software which is stored in the storage unit 250. Examples of the application processing function include an infrared communication function which controls the external input/output unit 260 such that data communication with an opposing apparatus is performed, an electronic mail function which transmits and receives electronic mail, and a web browsing function which browses web pages.

The main control unit 200 has, for example, an image processing function which displays a video on the display input unit 220 on the basis of image data (still image data or motion picture data) such as received data or downloaded streaming data. The image processing function means the function of the main control unit 200 decoding the image data, performing image processing on the decoding result, and displaying the image on the display input unit 220.

The main control unit 200 performs display control for the display panel 221 and operation detection control for detecting the operation of the user through the operation unit 240 and the operation panel 222.

The main control unit 200 performs the display control to display a software key, such as an icon for starting application software or a scroll bar, or to display a window for creating electronic mail. The scroll bar means a software key for receiving a command to move a displayed portion of an image that is too large to fit into the display region of the display panel 221.

The main control unit 200 performs the operation detection control to detect the operation of the user input through the operation unit 240, to receive an operation for the icon or the input of a character string to an input field of the window through the operation panel 222, or to receive a request to scroll the displayed image through the scroll bar.

In addition, the main control unit 200 has a touch panel control function that performs the operation detection control to determine whether the position of an operation for the operation panel 222 is an overlap portion (display region) which overlaps the display panel 221 or an outer edge portion (non-display region) which does not overlap the display panel 221 other than the overlap portion and controls a sensitive region of the operation panel 222 or the display position of the software key.

The main control unit 200 can detect a gesture operation for the operation panel 222 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 241 (optical system) is a digital camera that electronically captures images, using an imaging lens and an imaging element, such as a complementary metal oxide semiconductor (CMOS) or a charge-coupled device (CCD). In addition, the camera unit 241 can convert captured image data into image data compressed in, for example, a JPEG format, record the image data on the storage unit 250, or output the image data through the external input/output unit 260 or the wireless communication unit 210, under the control of the main control unit 200. In the smart phone 201 illustrated in FIGS. 19 and 20, the camera unit 241 is mounted on the same surface as the display input unit 220. However, the mounting position of the camera unit 241 is not limited thereto. For example, the camera unit 241 may be mounted on the rear surface of the display input unit 220. Alternatively, a plurality of camera units 241 may be mounted. In a case in which the plurality of camera units 241 are mounted, the camera units 241 used for imaging may be switched such that the independent camera unit 241 captures images or the plurality of camera units 241 may be used at the same time to capture images.

The camera unit 241 can be used for various functions of the smart phone 201. For example, the image acquired by the camera unit 241 may be displayed on the display panel 221 or the image acquired by the camera unit 241 may be used as one of the operation input methods of the operation panel 222. In a case in which the GPS receiving unit 270 detects the position, the position may be detected with reference to the image from the camera unit 241. In addition, the optical axis direction of the camera unit 241 in the smart phone 201 may be determined or the current usage environment may be determined, with reference to the image from the camera unit 241, using the triaxial acceleration sensor or without using the triaxial acceleration sensor. Of course, the image from the camera unit 241 may be used in the application software.

In addition, for example, the positional information acquired by the GPS receiving unit 270, the voice information acquired by the microphone 232 (for example, the voice information may be converted into text information by the main control unit), and the posture information acquired by the motion sensor unit 280 may be added to still image data or motion picture data and the image data may be recorded on the storage unit 250 or may be output through the external input/output unit 260 or the wireless communication unit 210.

In the third embodiment, each function or each process procedure (see FIGS. 3 and 6) of the image processing unit 35 described in the first and second embodiments is implemented by, for example, the main control unit 200.

The examples of the invention have been described above. However, the invention is not limited to the above-described embodiments and modifications and various modifications of the invention can be made without departing from the scope and spirit of the invention.

EXPLANATION OF REFERENCES

10: digital camera
12: lens unit
14: camera body
16: imaging lens
17: stop
18: optical system operation unit
19: memory
20: lens unit controller
22: lens unit input/output unit
26: imaging element
28: camera body controller
29: user interface 30: camera body input/output unit
31: liquid crystal monitor
32: input/output interface
34: device control unit
35: image processing unit
40: image acquisition unit
41: coordinate transformation unit
42: resolution enhancement processing unit
43: inverse transformation unit
44: information acquisition unit
50: object
51: captured image
51a: region
52: coordinate-transformed image
53, 55: captured image
56, 57: coordinate-transformed image
60, 90: computer
62: computer input/output unit
64: computer controller
66: display
70: Internet
80: server
82: server input/output unit
84: server controller
92: image acquisition unit
94: information acquisition unit
96: coordinate transformation unit
98: resolution enhancement processing unit
99: inverse transformation unit
200: main control unit
201: smart phone
202: housing
210: wireless communication unit
220: display input unit
221: display panel
222: operation panel
230: calling unit
231: speaker
232: microphone
240: operation unit
241: camera unit
250: storage unit
251: internal storage unit
252: external storage unit
260: external input/output unit
270: receiving unit
270: GPS receiving unit
280: motion sensor unit
290: power supply unit
Do: original image data
Dr: restored image data
F, G: restoration filter
P10: point image restoration process
P20: restoration filter calculation algorithm
P30: coordinate transformation process
S, T: resolution
S10, S11, S12, S13, S14: Step
ST1, STn: GPS satellite
$f_1, f_2, f_3, f_4, f_5, f_6, f_L, f_H$: spatial frequency

What is claimed is:

1. An image processing apparatus comprising:
an image acquisition unit that acquires a captured image of an object captured through an imaging lens;
a coordinate transformation unit that performs coordinate transformation for the captured image such that a sagittal resolution in a direction tangent to circumference having a center of an imaging surface as an origin and a tangential resolution in a radial direction perpendicular to the tangential direction are close to each other at a designated spatial frequency;
a resolution enhancement processing unit that performs a rotationally-symmetric resolution enhancement process for the coordinate-transformed image; and
an inverse transformation unit that performs inverse transformation of the coordinate transformation for the image subjected to the resolution enhancement process.

2. The image processing apparatus according to claim 1, further comprising:
an information acquisition unit that acquires information of the sagittal resolution and information of the tangential resolution of the captured image,
wherein the coordinate transformation unit performs the coordinate transformation on the basis of the acquired information of the sagittal resolution and the acquired information of the tangential resolution.

3. The image processing apparatus according to claim 1, further comprising:
an optical system including the imaging lens,
wherein the image acquisition unit acquires the captured image through the optical system.

4. The image processing apparatus according to claim 3, wherein, in the imaging lens, a sagittal resolution in a direction tangent to circumference having an optical axis as a center is higher than a tangential resolution in a radial direction perpendicular to the tangential direction.

5. The image processing apparatus according to claim 4, wherein the coordinate transformation unit performs at least one of coordinate transformation for compressing a peripheral portion of the captured image or coordinate transformation for expanding a central portion of the captured image.

6. The image processing apparatus according to claim 3, wherein distortion of the imaging lens is positive.

7. The image processing apparatus according to claim 3, wherein, in the imaging lens, a tangential resolution in a radial direction of circumference having an optical axis as a center is higher than a sagittal resolution in a tangential direction perpendicular to the radial direction.

8. The image processing apparatus according to claim 7, wherein the coordinate transformation unit performs at least one of coordinate transformation for expanding a peripheral portion of the captured image or coordinate transformation for compressing a central portion of the captured image.

9. The image processing apparatus according to claim 3, wherein distortion of the imaging lens is negative.

10. The image processing apparatus according to claim 3, wherein the coordinate transformation unit corrects the distortion of the imaging lens using the coordinate transformation.

11. An image processing apparatus comprising:
an image acquisition unit that acquires a captured image of an object captured through an imaging lens;
a coordinate transformation unit that performs coordinate transformation for the captured image such that a sagittal resolution in a direction tangent to circumference having a center of an imaging surface as an origin and a tangential resolution in a radial direction perpendicular to the tangential direction are close to each other at a designated spatial frequency; and a resolution enhancement processing unit that performs a rotationally-symmetric resolution enhancement process for the coordinate-transformed image,
wherein, in a case in which the higher of the sagittal resolution and the tangential resolution at the designated spatial frequency is 1 in the coordinate-transformed image, the coordinate transformation unit performs the coordinate transformation such that the lower of the sagittal resolution and the tangential resolution is equal to or greater than 0.5, preferably equal to or greater than 0.75.

12. The image processing apparatus according to claim 11, further comprising:
an information acquisition unit that acquires information of the sagittal resolution and information of the tangential resolution of the captured image,
wherein the coordinate transformation unit performs the coordinate transformation on the basis of the acquired information of the sagittal resolution and the acquired information of the tangential resolution.

13. The image processing apparatus according to claim 11, further comprising:
an optical system including the imaging lens,
wherein the image acquisition unit acquires the captured image through the optical system.

14. The image processing apparatus according to claim 13,
wherein, in the imaging lens, a sagittal resolution in a direction tangent to circumference having an optical axis as a center is higher than a tangential resolution in a radial direction perpendicular to the tangential direction.

15. An image processing method that is performed in an image processing apparatus comprising an image acquisition unit, a coordinate transformation unit, and a resolution enhancement processing unit, the method comprising:
an image acquisition step of allowing the image acquisition unit to acquire a captured image of an object captured through an imaging lens;
a coordinate transformation step of allowing the coordinate transformation unit to perform coordinate transformation for the captured image such that a sagittal resolution in a direction tangent to circumference having a center of an imaging surface as an origin and a tangential resolution in a radial direction perpendicular to the tangential direction are close to each other at a designated spatial frequency; and
a resolution enhancement processing step of allowing the resolution enhancement processing unit to perform a rotationally-symmetric resolution enhancement process for the coordinate-transformed image, and
an inverse transformation step of performing inverse transformation of the coordinate transformation for the image subjected to the resolution enhancement process.

16. The image processing method according to claim 15, further comprising:
an information acquisition step of acquiring information of the sagittal resolution and information of the tangential resolution of the captured image,
wherein, in the coordinate transformation step, the coordinate transformation is performed on the basis of the acquired information of the sagittal resolution and the acquired information of the tangential resolution.

* * * * *